(12) United States Patent
Lu et al.

(10) Patent No.: US 11,755,752 B2
(45) Date of Patent: Sep. 12, 2023

(54) END-TO-END PRIVACY ECOSYSTEM

(71) Applicant: ALLSTATE INSURANCE COMPANY, Northbrook, IL (US)

(72) Inventors: Marvin Lu, Northbrook, IL (US); Timothy Gibson, Northbrook, IL (US); Thomas J. Wilson, Northbrook, IL (US); Aleksandr Likhterman, Northbrook, IL (US); Raja Thiruvathuru, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/587,815

(22) Filed: Jan. 28, 2022

(65) Prior Publication Data

US 2023/0065559 A1 Mar. 2, 2023

Related U.S. Application Data

(60) Provisional application No. 63/239,215, filed on Aug. 31, 2021.

(51) Int. Cl.
*G06F 21/60* (2013.01)
*G06F 21/62* (2013.01)

(52) U.S. Cl.
CPC ............ *G06F 21/604* (2013.01); *G06F 21/62* (2013.01); *G06F 21/6245* (2013.01);
(Continued)

(58) Field of Classification Search
CPC ..... G06F 2221/2113; G06F 2221/2137; G06F 2221/2141
See application file for complete search history.

(56) References Cited

U.S. PATENT DOCUMENTS 10,832,299 B1 * 11/2020 Clauss ............... G06Q 30/0611
2012/0296799 A1   11/2012 Playfair et al.
(Continued)

FOREIGN PATENT DOCUMENTS

EP    2544117 A1    1/2013
ES    2414581 A2    7/2013
(Continued)

OTHER PUBLICATIONS

Itani, Wassim, Ayman Kayssi, and Ali Chehab. "Privacy as a service: Privacy-aware data storage and processing in cloud computing architectures." 2009 Eighth IEEE International Conference on Dependable, Autonomic and Secure Computing. IEEE, 2009.

*Primary Examiner* — Noura Zoubair
(74) *Attorney, Agent, or Firm* — Brooks Kushman P.C.

(57) ABSTRACT

A system includes a privacy vault storing user-associated contents. The vault also stores access permissions defined for third-parties with whom the user has a sharing relationship. An access permission defines, for at least one third party, procurement and utilization policies for vault contents accessed by the third-party. The system may access a user account to recover user-associated contents stored by the accessed account and stores the recovered contents in the privacy vault. The system receives a request from a third-party to access identified contents stored in the privacy vault and determines if the contents are procurable by the third party based on an access permission defined, in the privacy vault, for the third-party. The system provides procurable contents to the third party along with indication of any constraints on the contents defined by utilization policies of the access permission defined for the third party.

16 Claims, 8 Drawing Sheets

(52) U.S. Cl.
CPC ............... *G06F 2221/2113* (2013.01); *G06F 2221/2137* (2013.01); *G06F 2221/2141* (2013.01)

(56) References Cited

U.S. PATENT DOCUMENTS

| | | | |
|---|---|---|---|
| 2013/0035992 A1 | 2/2013 | Silverman | |
| 2015/0118667 A1 | 4/2015 | Andrew et al. | |
| 2015/0254456 A1* | 9/2015 | Jacquin | G06F 21/6245 726/1 |
| 2015/0310575 A1* | 10/2015 | Shelton | H04L 63/10 705/325 |
| 2015/0350194 A1 | 12/2015 | Gilpin et al. | |
| 2016/0217295 A1 | 7/2016 | Goldsack et al. | |
| 2017/0063553 A1* | 3/2017 | Saxena | H04L 9/3226 |
| 2017/0351978 A1 | 12/2017 | Bellowe | |
| 2019/0392162 A1* | 12/2019 | Stern | G06F 21/6245 |
| 2020/0004839 A1 | 1/2020 | Naravanekar | |
| 2021/0056184 A1 | 2/2021 | Modani et al. | |
| 2021/0182915 A1 | 6/2021 | Blaikie, III et al. | |
| 2021/0334837 A1* | 10/2021 | Postrel | H04L 63/102 |

FOREIGN PATENT DOCUMENTS

| | | |
|---|---|---|
| WO | 2016198229 A1 | 12/2016 |
| WO | 2021130488 A1 | 7/2021 |

* cited by examiner

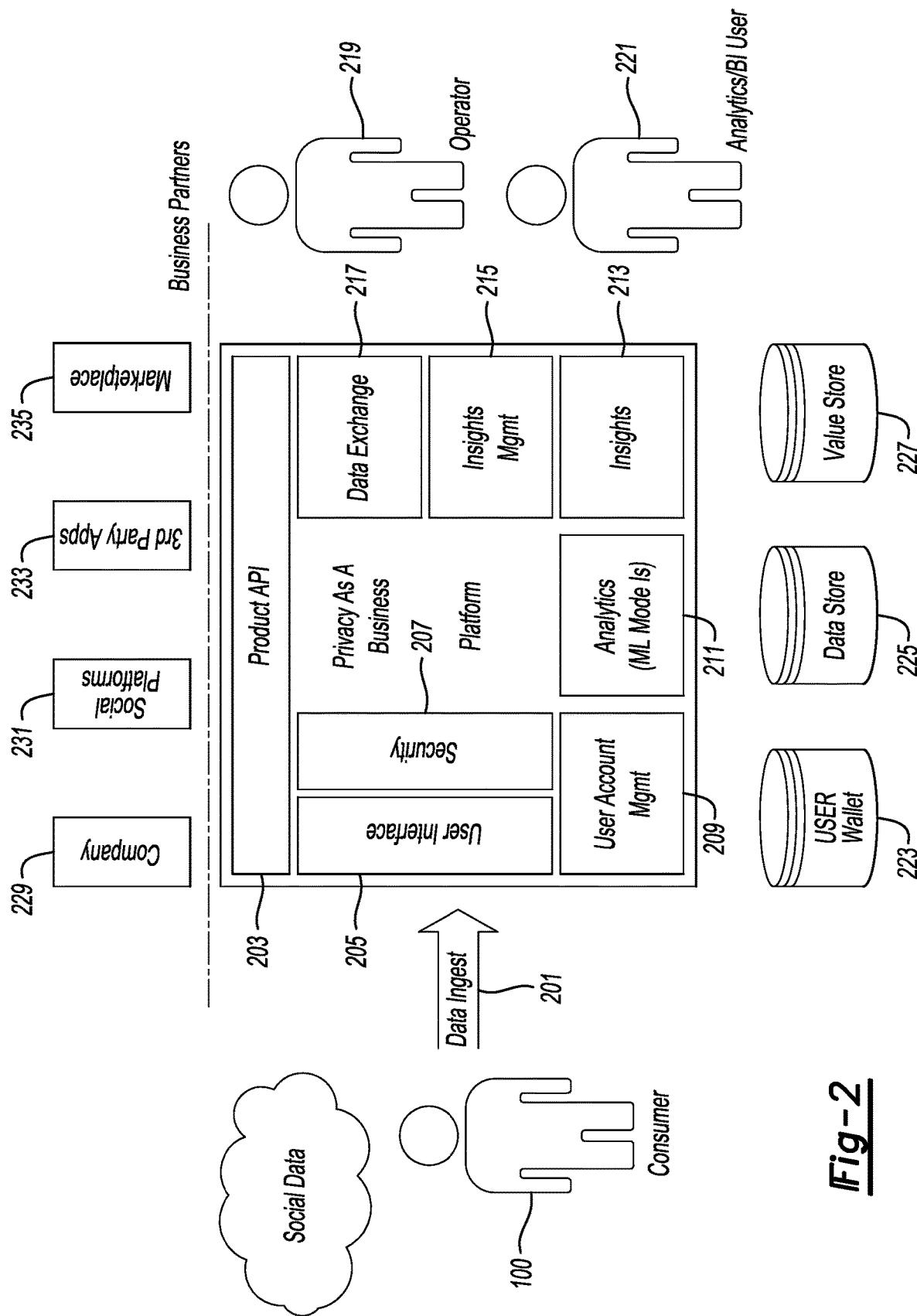

END-TO-END PRIVACY ECOSYSTEM

CROSS-REFERENCE TO RELATED APPLICATIONS

This application claims the benefit of U.S. provisional application Ser. No. 63/239,215 filed Aug. 31, 2021, the disclosure of which is hereby incorporated in its entirety by reference herein.

TECHNICAL FIELD

The illustrative embodiments generally relate to an end-to-end privacy ecosystem.

BACKGROUND

Digital user privacy, consumer data collection and data monetization are becoming ever-more prevalent issues in modern society. Computing devices, software, hardware, and websites continually gather data on users to build profiles, offer advertisements, and plan strategies. Many times, users are not even aware of what data is being gathered and how that data is being used, and software or websites may frequently offer services in exchange for data, such as a "free" search engine or social media site that exchanges services for gathering of user data.

For a long time, users were willing to accept these services in exchange for the data, believing the data to be limited in scope, the use and business-to-business sharing of the data to be limited in scope, or being unaware of the true value of their personal data in the aggregate. The financial success of these services, predicated largely on data, has revealed some of the true value of user data. At the same time, data gathering and processing has grown much more sophisticated, allowing for the unlocking of significant value in large data sets about individual users and groups of users.

Problematically, users have already often agreed to have this data gathered and enjoy using the free services. Moreover, users still frequently have no idea as to what data is or was gathered about them. Far more than a simple location or demographic, these data sets can range far and wide, and user behavior itself is often monitored and compiled into complex evaluations of what that user represents in terms of merchant or advertiser opportunity. At the same time, there are limited opportunities to determine what data has been gathered and how the data is being used, and most frequently the impact and scope is observed anecdotally, where a user continually sees advertisements, for example, that appear to be highly targeted. The scope of data is also hinted at when software provides recommendations and seems almost prescient in its understanding of what the user would like.

While many users may not object to the targeted and precise nature of at least some of these incidents, and may even welcome them in some cases, such as a requested and subsequently on-point recommendation, many users may ultimately be somewhat disturbed at the scope and scale of their own personal information stored and used to assemble these offerings. But, since users can never see the backend data store, and since they typically lack granular control over data, and/or notification when and what data is specifically gathered, people tend to remain somewhat blissfully ignorant, even if they would be distressed if they saw the volume of personal information being gathered, understood the value of what they were exchanging, and understood the full scope of the conclusions that were being drawn about them. Because it may be rare that the user's data is used exclusively to provide a requested and subsequently on-point recommendation, consumers may ultimately prefer a solution that provides better optics into usage, consumer-centric control and permissioning of such usage and value-sharing opportunities related to a consumer's personal information.

SUMMARY

In a first illustrative embodiment, a system includes a privacy vault, storing contents associated with a user to whom the privacy vault is assigned. The vault also stores a plurality of access permissions, defined for a plurality of third-parties with whom the user has an agreed-upon sharing relationship, at least one of the access permissions defining, for at least one of the plurality of third parties, procurement and utilization policies for contents accessed by the at least one third-party, and a plurality of user accounts and associated access credentials for the user.

The system further includes one or more processors, configured to access one or more of the user accounts, using the access credentials, to recover contents, stored by the accessed account and associated with the user and store the recovered contents in the privacy vault. The one or more processors are also configured to receive a request from the at least one third-party, to access the contents stored in the privacy vault, the request identifying which contents are requested and determine if the contents requested are procurable by the at least one third party based on the at least one access permission defined, in the privacy vault, for the at least one third-party. Responsive to the contents being procurable, the one or more processors are configured to provide the contents to the at least one third party along with indication of any constraints on the contents defined by utilization policies of the at least one access permission defined for the at least one third party.

In a second illustrative embodiment, a system includes a privacy vault, storing contents associated with a user to whom the privacy vault is assigned. The vault also stores a plurality of access permissions, defined for a plurality of third-parties with whom the user has an agreed-upon sharing relationship, at least one of the access permissions defining, for at least one of the plurality of third parties, procurement and utilization policies for contents accessed by the at least one third-party and a plurality of user accounts and associated access credentials.

The system additionally includes one or more processors, configured to access one or more of the user accounts, using the access credentials, to recover contents, stored by the accessed account and associated with the user. The one or more processors are also configured to categorize the recovered contents as the contents are recovered and store the recovered contents in the privacy vault and associate applicable categories, as indicated by the categorization, with the stored recovered contents. Also, the one or more processors are configured to receive a request from the at least one third-party, to access the contents stored in the privacy vault, the request identifying which contents are requested and determine if the requested contents are procurable by the at least one third party based on the at least one access permission defined, in the privacy vault, for the at least one third-party. Responsive to the contents being procurable, the one or more processors are configured to provide the contents to the at least one third party along with indication of any constraints on the contents defined by utilization policies of the at least one access permission defined for the at least one third party.

In a third illustrative embodiment, a system includes a privacy vault, storing contents associated with a user to whom the privacy vault is assigned. The vault also stores a plurality of access permissions, defined for a plurality of third-parties with whom the user has an agreed-upon sharing relationship, at least one of the access permissions defining, for at least one of the plurality of third parties, procurement and utilization policies for contents accessed by the at least one third-party and a configuration for default access permission application to a new third-party.

The system further includes one or more processors, configured to receive identification of the new third-party and determine whether any modification, to a default access permission to be applied to the new third-party indicated by the configuration, applies to the new third-party based on any agreement information included with identification of the new third-party. Responsive to determining that no modification applies, the one or more processors are configured to associate the default access permission with the new third-party based on the configuration.

BRIEF DESCRIPTION OF THE DRAWINGS

FIG. 2 shows an illustrative example of a privacy management platform;

DETAILED DESCRIPTION

Figure 1A:
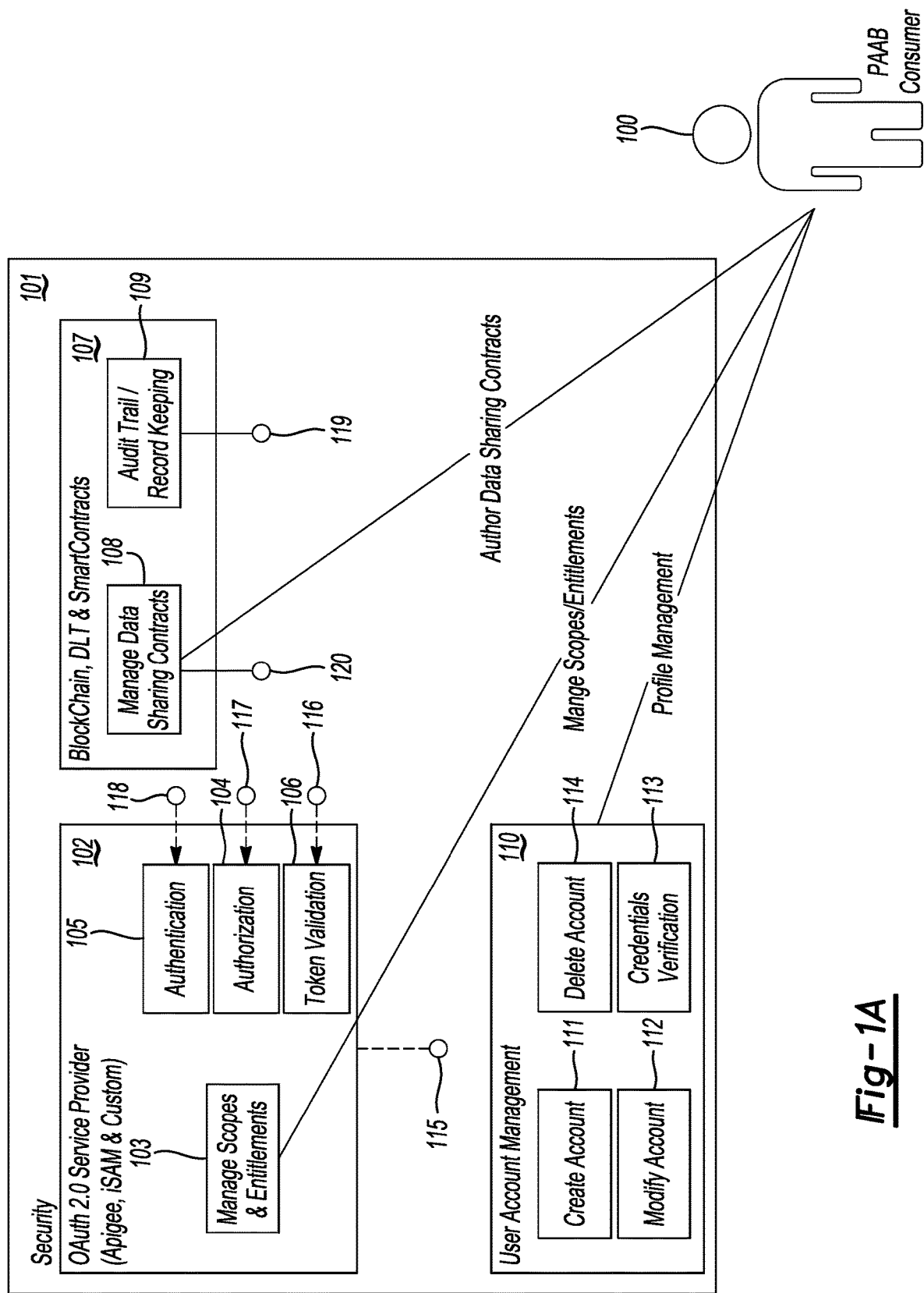
FIGS. 1A-1C show an illustrative example of non-limiting elements of a data-privacy, data ownership, and user-empowering data marketplace system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a first mobile, personal or cloud computing system, in certain embodiments, the exemplary processes may be executed by a second computing system in communication with the first computing system. Either system may include, but is not limited to, a wireless device (e.g., and without limitation, a mobile phone) or a remote computing system (e.g., and without limitation, a server) connected through the wireless device. In certain embodiments, particular components of either system (or additional systems) may perform particular portions of a process depending on the particular implementation of an embodiment or an implementation similar to an embodiment. By way of example and not limitation, if a process has a step of sending or receiving information in conjunction with a wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication, and other suitable wireless and wired communication usable for both short range and long-range wireless transmission as appropriate for a given implementation.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired and the examples are intended to illustrate, but not limit, aspects of the proposed embodiments and inventive concepts.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments, and the like, propose elements of an ecosystem for monitoring, understanding, controlling, reclaiming, storing, sharing, purging, and even monetizing a user's personal data, which can be thought of as user personal digital contents of a digital personal data store, digital privacy vault, digital privacy locker, digital privacy data store, etc. Aspects of the illustrative embodiments, and the like, put knowledge and control back into the hands of the users. Even if users armed with such information choose to share their data and/or exchange the data for some other value, they can now have much better understanding of the exchange, and can thus act as an educated negotiator, deriving something closer to true value in exchange for their information. While backend websites and software systems may still gather data and obtain value from user data, the user, armed with knowledge and at least somewhat granular control, if desired, becomes capable of leveling the scales somewhat in terms of the trade-off Whether or not this results in a perfect exchange of value for a user's personal information, such systems, as described by the illustrative embodiments and the like, may at least allow the user to come much closer in obtaining fair value, in addition to providing more choice and control in the matter. Further, the user may know what information is being collected and stored by which software and websites, be able to define what information can be kept by the same, and experience opportunities to dictate which data is to be expressly removed, including data that may have been exchanged in the past for services no longer required.

In some instances, users may be able to see what conclusions are being drawn or are likely being drawn and based on what data. If the conclusion reveals something about the user that the user would prefer not to be concluded, or something that is simply erroneous, the user may be able to prevent sharing of some or all data used to reach that conclusion. Or the user may only choose to share that data with entities for which the user does not object to the conclusion being drawn, and selectively prevent other entities from drawing such conclusions.

As the control of the data shifts back to the user, merchants and services may be incentivized to create better value in exchange for the information they require. That is, while users may be perceived as being "addicted" to the free services provided in exchange for data, merchants, especially advertisers, are similarly "addicted" to user data, and often an entire business has been built around the predicate that it will have somewhat unlimited and unfettered access to data. Loss of data access, to those entities, may be catastrophic, and thus those entities may be willing to exchange significant value to keep the data pipeline open. Even when the situation is not so dire for a merchant or service, virtually every business can benefit from some level of data analysis, and so all such beneficiaries may be willing to exchange some portion of that benefit to users in order to obtain the value.

In the modern paradigm that previously existed, businesses that could gather data without impediment may have obtained certain value from the data, and the proposed illustrative embodiments may make it possible for a consumer to capture some portion of that value. As long as the portion shared with the user is not equal to the business's original value in terms of value-exchange, the business is still benefitting. And consumers, who have previously been giving the data away for free, in many instances, may happily provide something they were already providing in exchange for additional value that they were not previously receiving.

The proposed illustrative embodiments, and the like, give users much more control over their data and allow users to maintain that control and ownership over their data. Further, the users may be able to derive additional value from their data, beyond what is already being obtained. That is, for a service that is free, but which provides value, a user may be happy to share data, but for a service which is being paid for, for example, a user has already traded value for that service, and in an instance such as that, the user may require additional value in return for allowing the service to use the user's data. Even in the free-service instance, the user may be providing more value than the service is worth to the user, but only a user can draw this personal conclusion, and they may only be able to draw it when they actually understand what is being shared or kept, or what conclusions are being drawn from their data and how their data is being used.

Another source of value could include access to cross-platform data and insights. This can be valuable to both a consumer and/or a business entity. A consumer, for example, may want a comprehensive view of "food and dining" habits, which can include analysis of data from a wealth of sources—e.g., search engines, grocery purchases, restaurant visits and orders, viewing habits (e.g., cooking shows), etc. A business may value this information as it may paint a much more complete picture of a consumer than would be available from the limited data typically available to that business (i.e., the habits of the user as indicated by the direct interactions with that particular business). Typically, all of these disparate sources of information are difficult to bring together, especially with regards to the data pertaining to a single person. By providing a consolidated data store, comprehensive data can be analyzed on behalf of the consumer and/or provided by the consumer in exchange for value. As a more-inclusive viewpoint, this would likely be more valuable than knowledge of some of the individual elements, and moreover, a business could provide a fair value for the amalgamation of the data that reflects the savings to the business of both the cost and hassle of attempting to build a consumer profile from many discrete sources.

Figure 1B:
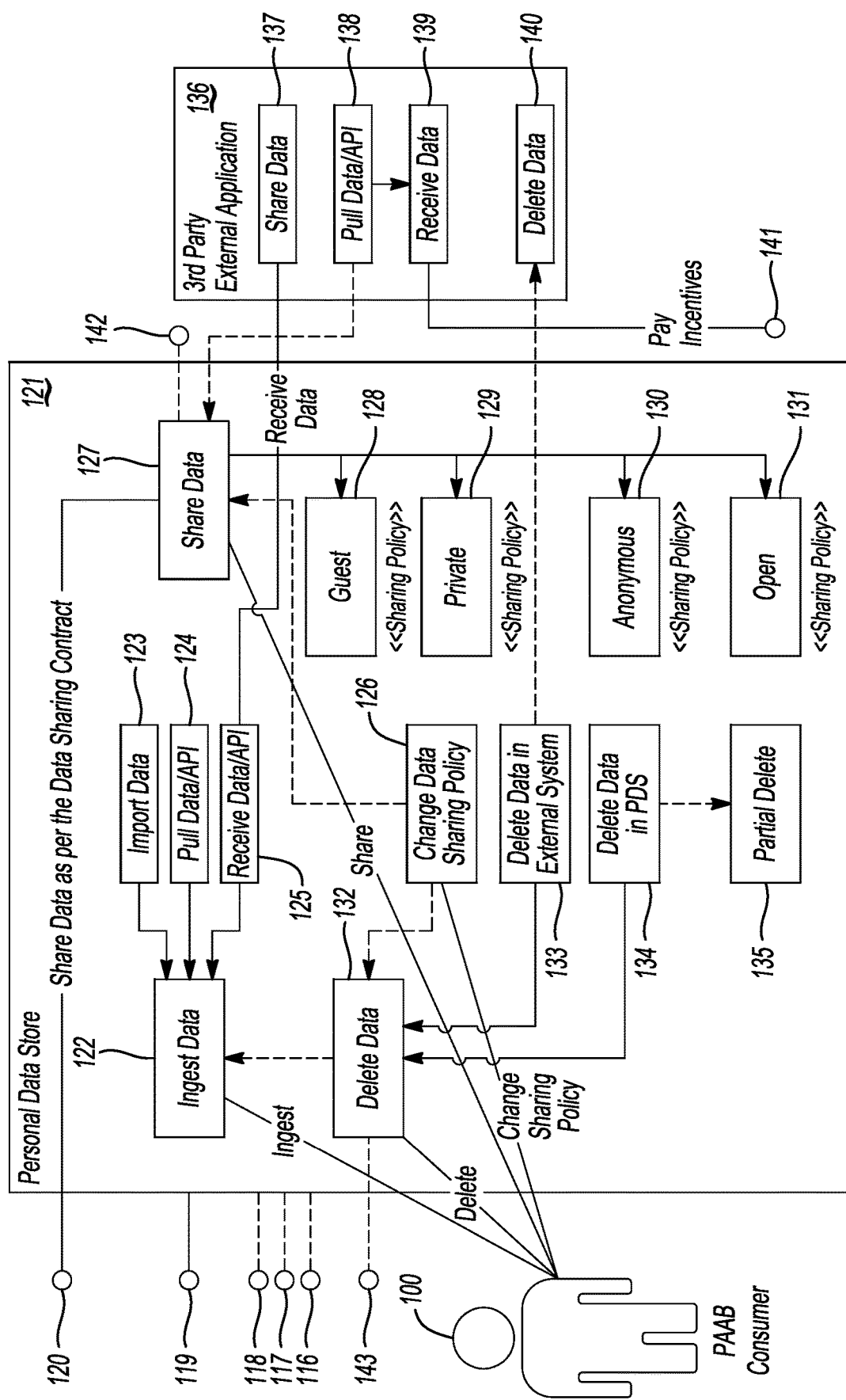
Figure 1C:
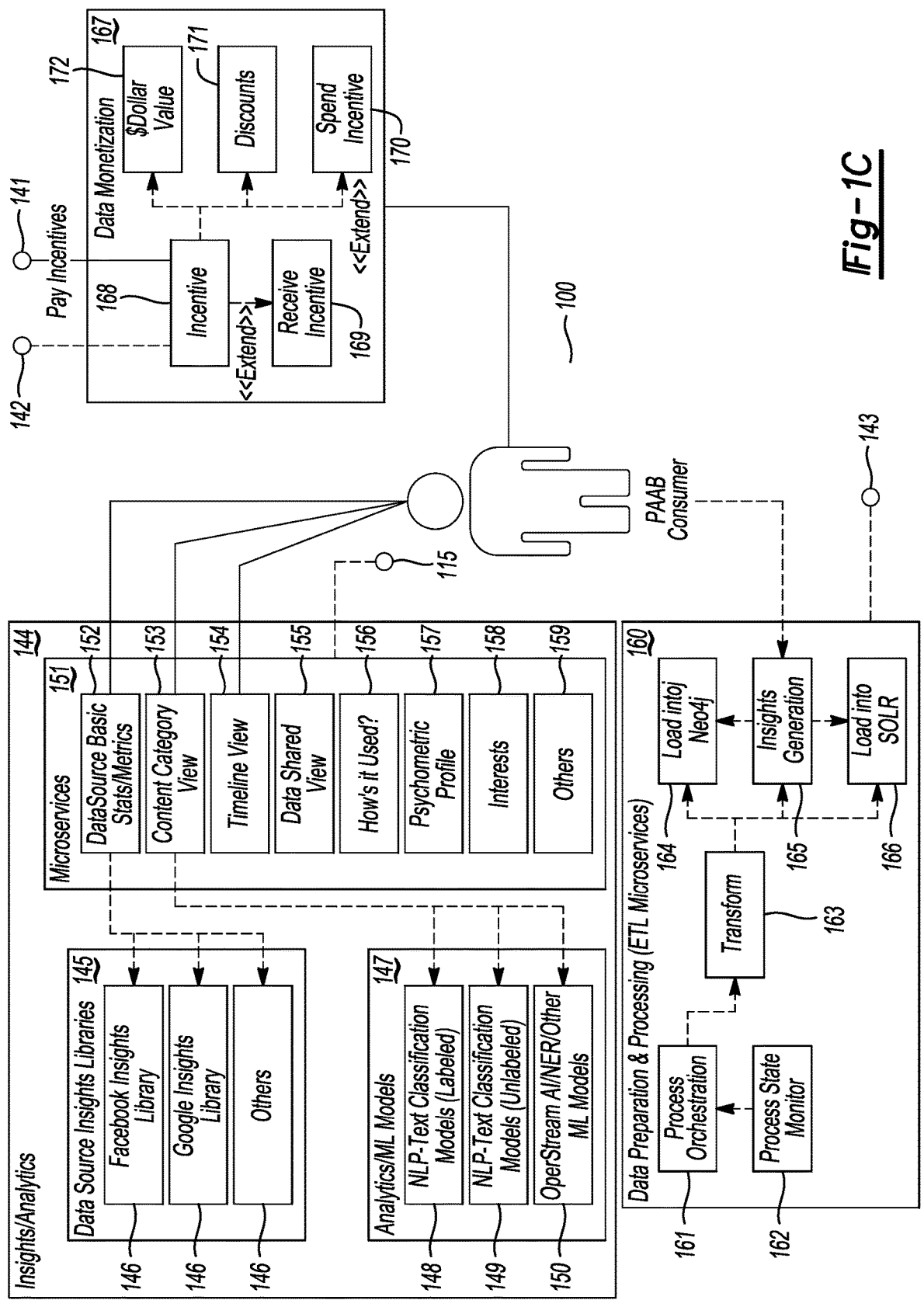

FIGS. 1A-1C show an illustrative example of non-limiting elements of a data-privacy, data ownership, and user-empowering data marketplace system. Not all elements would be necessary in a given implementation, interactions between elements may vary, and a skilled artisan will recognize that elements may be added or removed as appropriate for a particular implementation of all or an aspect of the ecosystem or a similar ecosystem. Privacy as a Business (PaaB) is a generalized notion representing the idea that a consumer can take possession and ownership of their personal data and control access, control storage, port the data, manage the data, market and otherwise derive value from the data, etc., and is not intended to limit the scope of the concepts in any manner.

The following examples describe illustrative, non-limiting aspects of the illustrative ecosystem that, in this example, comprises security 101, a personal data store 121, analytics and insights 144, data preparation 160, data monetization 166 and the ability to interface with third party applications 136. Aspects of this and similar ecosystems serve to provide comprehensive data protection, control, and monetization opportunities for a user/consumer 100.

Security, in this example, includes authorization services 102, which can provide authentication 103, authorization 104 and token validation 105 for various requests for information or services relating to a consumer/user's personal data.

Security 101 may also include account management services 110, which allow the consumer 100 to create accounts 111, modify accounts 112, delete accounts 114 and which includes some verification credentials 113. A consumer 100 may request creation of an account to store a personal data store (PDS) 121 and provide analytics and microservices related to that account. Personal data stores can also be thought of as privacy data stores, privacy vaults, privacy lockers, etc. The consumer may also, in at least certain embodiments, store additional credentials associated with the account, which can be credentials for sources of potential data. That is, while it may be possible to simply assert that a data gathering process is acting on behalf of a consumer, some entities that store data may also request further credentials. If the data gathering service is a trusted party, then such credentialing may not be necessary, but until a trusted relationship or platform is built, third-party services may be loath to release personal information to an entity purporting to represent the consumer 100.

The consumer 100 may also have one or more data-sharing contracts 107 that define data sharing relationships with third-parties. These may include pre-existing relationships that have to be honored (or eventually modified) and/or newly formed sharing relationships. For example, a consumer 100 who has been using a service for free, in exchange for sharing data, may have some lingering obligation to continue to allow that service to use the data, at least for a time-period or until a legal change obligates the third-party to vacate the contract or change its terms.

Also, when a consumer seeks to monetize or otherwise use personal data after establishing a personal data store 121, the audit process 109 may track what data was stored with which entities. Keeping such a record of data allows the audit process to more closely check in the future if deletion/purge obligations were fulfilled. The audit process may also track what data is stored where when initially building a consumer data profile, so that knowledge of pre-existing offboard storage of data is maintained. This can be useful for future data pulls and if and/when a legal or contractual change to a pre-existing relationship allows for deletion or modification of the offboard data stored outside the PDS 121. That is, the consumer 100 may terminate the service, ending the obligation for sharing, and/or a legal change may allow the consumer to modify an existing agreement or mandate deletion of certain personal data from the offboard third-party server. The audit process, if it has a comprehensive list of what data exists where, whether shared from the PDS or discovered on behalf of the consumer 100, can use such records to perform a fast distribution of instructions to delete, modify or purge data storage outside the PDS 121.

As part of a privacy and data ecosystem, described in non-limiting example in the illustrative embodiments, consumers may have personal data stores (PDS) 121 that represent data storage for an individual consumer. This data may be aggregated over time through various ingestion processes 122 and may represent the data that would have been gathered and/or may be requested by countless services with which a consumer (user) may interact. Services may request data on a one-to-one basis from a consumer (e.g., for the purpose of performing a task on behalf of the consumer, such as providing an insurance quote) or may request data on a one-to-many basis from a plurality of consumers, (e.g., for the purpose of analyzing data indicative of a group).

Data ingestion 122 may include importation 123 of data from existing user relationships, such as existing user accounts with other sources that may store user data—e.g., without limitation, social media sites, search engines, paid-subscription sites (e.g., streaming media sites), etc. That is, most users 100 have significant off-site/offboard present storage of data, often without their direct knowledge of what is stored. Sources and storages of this data can include, for example, without limitation, social media sites, on-demand services (rideshares, media content sites, delivery services, etc.), personal and professional networking sites, search engines, email providers, personal fitness sites, shopping sites, consumer facing sites, and any other entity that has access to user personal data and stores one or more aspects of that data. The data itself, or personal digital contents to be stored in the digital privacy vault, can include, but is not limited to, date of birth, age, gender, name(s), friends, addresses, email addresses, contact information, phone numbers, education (certificates, courses, degrees, skills, etc.), languages spoken or read, employment history, property ownership, spending habits (costs, categories, volumes, etc.), ad click habits, subscriptions, interests (books, games, media, etc.), posts, comments, likes, pages visited (surfing habits), searches, online viewing/listening habits (movies, shows, videos, audio, podcasts, etc.), groups, polls, connections, affiliations, biological information, transportation uses, route usages, travel habits, frequent locations, etc. This data represents a useful building point for backfilling a PDS 121 and for allowing the audit process 109 to build a record of existing offboard data storage. Consumers 100 can also add data through pulls of data, such as through an API or interface with an application or site that allows the consumer 100 to expressly add data or which happens to be gathering data at any given moment. If the platform is in control of a consumer's data sharing, after a point, all data requested by a third-party can also be pulled into the platform and saved or discarded in accordance with a given consumer's preferences. Consumer 100 may dictate which data is stored by the PDS, as well as which data is available for sharing. As noted above, the consumer may expressly add data at any time, which can include filling in personal information, for example, correcting data or explicitly adding any data elements or types that the consumer wants to be reflected or stored in their privacy vault.

Ingestion may also receive data 125 from other third-party applications, which can be an alternative form of data-sharing where the third-party application reports what data it gathered and sends a copy of that data or information about what data was gathered to the ingestion process 122. When third-party applications are seeking to build a more trustworthy relationship with a consumer, they have an added incentive to provide such information to prove their particular trustworthiness. Moreover, such sharing may be dictated by terms of various smart contracts 108.

Since the PDS 121 is private and safe, and in the control of the consumer, storing a larger amount of data may not be as troublesome to a consumer. Moreover, the more data that is stored, the more opportunities that may exist for a user to monetize their own data. That is, certain aspects of the illustrative examples may allow for presenting offers to users based on whether a user has data that is of interest to an offeror, or that represents certain demographics. Of course, it may not be possible to know whether a user qualifies in the absence of data or access to an individual's data, so the individual consumer 100 may be able to dictate through policies 126 and contracts 108 what data is shared or willing to be shared and whether the consumer 100 opts to have their data 121 used for the purpose of originating offers.

A group of PDSs may also represent an opportunity for cost-savings for traditional data-holding entities. A company or service could architect its own platform to utilize its users' PDSs as data stores for operational data. This can result in significant savings in data centers and/or cloud services and effectively make the group of PDSs a decentralized data center.

The user's data would still be protected until an offer is accepted, but certain users may want to allow their data to be used in exchange for value opportunities. Those users could opt-in to value sharing offers, and whenever appropriate, or as permitted by the user, appropriate offers could be provided to the user. If the user accepted the offer, data could be anonymized, shared, and deleted or stored (by the offeror) based on the terms of the offer. This could allow for, for example, advertisement provision to a user while keeping the data anonymous. But, in the example above, not only would the user still see a "preferred ad," but the source of the ad would have no direct information about to whom the ad was presented and the user also would have received some direct exchange of value in return for sharing the data (anonymously) that made the targeted nature of the ad possible. In further examples, where the user may receive greater exchange of value in return for less anonymity of the data, the ad may be personalized based on user data, but again, the user could control the level of anonymity and further the user would have already received some greater value proposition in exchange for the level of data shared and/or the level of anonymity chosen. For example, a user who elects to share an email address may receive a follow up email, but the user could have dictated that only one follow up email was permitted, and received some value exchange for sharing that level of information. If more than one email was received, the advertiser would be in violation of the defined policy and could be subjected to restriction as described in more detail below. If the level of restriction applied to the advertiser's ability to access a larger set of data across many privacy vaults, the advertiser would be unlikely to risk loss of such value to violate a policy for one user, and since the vaults collectively represent a unified source for a vast amount of data, there is a significant incentive to follow the defined policies. Further, the revenue from the advertisements themselves could be shared with the users, getting them paid both for sharing the data and for any subsequently generated revenue resulting from presentation or utilization of the advertisement.

On the other hand, some users may be very protective of their data, and may not want it even queried anonymously for offers. Those users may also value their data over the exchange for value, and so in those instances the personal data stores could be kept private unless expressly given permission for sharing. Certain services may require certain data to function, but at the same time, those users could have a high degree of control over what they are sharing, for what that data is used, and for how long it is being kept.

Users may also select sharing policies (also referred to as access permissions) 126 for their data, defined for an entire PDS or perhaps on a service-by-service (entity-by-entity) basis. For example, a user may have a default sharing policy for unfamiliar or uncommon services, that shares very limited, anonymous data and inform the user what is being requested and returned. On the other hand, a trusted subscription service may receive more data with less transparency, not because the user necessarily does not want to know, simply because the user already knows what is being shared with that entity and is ok with the sharing. Thus, users can achieve granular control over their data and maintain efficient and unbothersome relationships with trusted entities, while at the same time having tighter control over what is being shared with less familiar sites and applications. Additionally or alternatively, the user can define policies for groups of services (e.g., food delivery services, banks, etc.).

The illustrative example shown in FIG. 1B shows a four-tier approach to sharing that includes guest 128, private 129, anonymous 130 and open 131 as various policies or access permissions that may be applied to either a given third-party or a record or data element or group. From one perspective, these policies may dictate the level of access for a given third-party, and classifications of the data elements and/or types or groups of data may determine whether a given element or type of data can permissibly be requested by the third-party. All relationships may begin at a restrictive tier, such as guest 128, if desired. Of course, the number of policies could be one policy, two policies or any other number of policies, and may range from consistent tiered-application to any number of policies varied discretely for each entity or group to which a given policy applies or is instructed to apply by a user or managing entity.

The guest policy 128, in this example, allows certain data to be exchanged as needed, for a present interaction. A policy 126 and/or smart contract 108 (which can be instantly generated and agreed-to by a requesting entity in order to obtain any data at all) will dictate usage and storage of the data, which in this case is no-storage and limited usage, with no cookies. The smart contract can represent an instantaneous and momentary relationship or an ongoing one, pursuant to the wishes of the consumer and the willingness of the third-party. Even if the contract is for the purposes of a single interaction, its terms may be legally binding in terms of the third-party's obligation not to use the data outside the dictates of the contract. While perhaps finding such restrictions a bit onerous, third-parties are likely to agree on some level because they still may want traffic from consumers using PDSs, especially if PDS usage is adopted at scale. Moreover, this increases incentive to provide additional value in order to move the contract to a less restrictive level, such as private 129.

The private policy 129 may allow for the third-party to retain data, but only use it on behalf of the consumer 100. This can save on data transfer time and may even allow for usage of the data in modeling solutions directly for the consumer but may prevent sale and other usage that is outside the scope of a service directly on behalf of the consumer. The smart contract and/or policy may better define what "on behalf of the consumer" means, so that a third-party cannot allege that their use or sale of the data in certain manners indirectly benefitted the consumer by cheapening services and/or improving general processes. On the other hand, a given entity may ask the consumer for such a modification, which can result to a carve-out in the policy for the given third-party or a reduction of the policy to a next less restrictive tier, such as anonymous 130. Since the policies can be redefined for given relationships as needed, and terms dictate by smart contracts 108, even a model that begins with four levels of privacy does not need to only ever provide those four levels. Moreover, allowing modification of contracts may further incentivize third-parties to provide value for data access, and users can negotiate or pseudo-negotiate term changes.

In one example, there may be an existing paradigm of policy settings and base smart-contracts that define initial policy tiers 126. Since these may be relative fixed as the baseline, individual third-parties can obtain copies of the contracts and propose modifications in exchange for value. That is, if the policies are thought of as 1-4 in terms of restrictive—open, a company may give X value for a 1.5 contract (somewhere between guest and private) and 3X value for a 3.5 contract (somewhere between anonymous and open). The particular revisions to a base policy sought by the company can be review specifically for that company (by a machine analysis process, for example), so that all users opting into that company's version of the 1.5 contract or 3.5 contract get the same terms and know what the "new" policy tier represents. Further, there may be multiple "3.5" contracts, which can be thought of as hybrid contracts, that are different for each third-party modifying the contract based on what that party wants, and a user may agree or disagree with any of them based on whether the offered value is sufficient.

Alternatively, the third-party can simply negotiate application of a less aggressive restriction, such as anonymous 130 or open 131. Anonymous may permit data sharing, usage and merging with other data, but only insofar as the data is anonymized first. The audit process 109 may require submission of samples to be shared or merged and can use machine-learning/artificial intelligence (ML/AI) to determine whether the data is sufficiently anonymous. Agreements with third-parties may stipulate that they have the same anonymization process once approved, and regular audits may confirm whether they are holding true to their word. The open policy 131 may simply allow for the use of data in an open manner as the third-party desires.

The platform may also alert a user about the dangers of policies such as "open" and may suggest that certain restrictions still be applied to certain data. That is, different data may also have metadata associated therewith dictating, for example, policies that apply or can never apply. For example, a user's driver's license number may only be permissibly shared under a guest or private policy, and even then with additional restrictions attached thereto. Groups of data that can be used to steal a user's identity may have recommendations and baseline restrictive sharing policies applied thereto, so that even if a user agrees to, for example, an open policy 131 with a third-party, access requests from the third-party for some data will still be denied. Moreover, users may even be obligated to expressly sign agreements indicating they are aware of the risks of sharing certain data each time they designate an entity to receive the highly sensitive data, just to protect the platform manager. Heavy handed alert and caution language can help prevent users from inadvertently sharing very sensitive data.

While it may be the case that so many data requests come from a site that it is impractical to literally inform the user of every request, even under the most restrictive policy, the policy may alternatively provide the user with a generalization of what is being requested. The requests may still be machine filtered as well, so that if the nature of the request changes, the user can be informed, but the user may find it acceptable to know the general nature of the data as opposed to having to approve every single request from a given application or site. Users could even see, for example, a browser symbol or score associated with a site as it is being browsed, to indicate the present level of sharing and/or present policy level associated with the site. This could serve as an assurance that an agreement is in place and that the site is in compliance. Non-compliant sites may fail to show the policy and/or result in some error in a plugin that was supposed to provide the policy score. An aggressive such plugin, were it the case that sites were spoofing policy scores, could work in conjunction with a rolling code authorization, wherein a user could use an application on their phone, for example, to verify a rolling code also displayed with the score, and only the specific user with the phone and the connection to the specific user's PDS could verify that the rolling code was correct for the user. Other secondary proof-of-score measures could also be implemented to prevent spoofing verification of a policy being in place and/or an overall score or value of the policy. Generally speaking, this allows a consumer to take a privacy-first approach to use of their data, controlling access but obtaining both direct value (remuneration) and implicit value (targeted information) based on their personal sharing preferences. Moreover, the nature of such value in both instances can be increased, as a central repository for all consumer personal contents can provide some assurances of deduplication and consolidation of data points, as well as present a sufficient incentive for third parties to play by the rules defined for them by a given consumer. Personal digital contents can continue to be gathered and saved to preserve the continual evolution of a consumer's information, but in a secure and controlled manner that assists in preventing usage of that information for any purpose other than what is preferred by the consumer.

Policies can be defined on a per-site, per-application basis, and may evolve over time. As software becomes smarter and better, policies may provide more detailed granularity of control. As a relationship with a website or application develops and matures, the user may also have the policy evolve to either share more data or at least share the requested data without user notification. Since users have selectable options for controlling policies, the choice can be left up to the user. Artificial intelligence software may aid in the application of policies as well, allowing for a more complicated default scheme or configuration wherein a user has some general preferences defined (e.g., by a survey or past behavior) and the AI attempts to match new third-parties based on context or other factors. Users can be asked to confirm the application of policies and be presented with the "reasoning" used by the AI, and over time, through machine learning, the AI can evolve to apply the default or hybrid versions of policies to new third-party entities in a manner that is consistent with a consumer's reflected wishes. Thus, there need not only be a single default policy, but default policy application can be automatically determined based on a configuration defining which default policies should be applied to which entities (specifically, by type, etc.).

For example, one user may set that when a set or application has been used 100 times, the policy can stop notifying the user when data is requested. Another user may set that when a user has confirmed a data request 3 times, requests of that nature from that site no longer need confirmation. Still another user may require that certain data is only shared with specific sites, and request denial of all requests for that data from every other site or application.

As an alternative to policy setting, which may be a complex task, depending on how granular the control and how many options exist, a user may instead be given a quiz or survey. With a carefully crafted series of questions, personalized privacy settings can be derived or closely approximated. Once complete, the user could be provided with an overview of the recommended settings so that fine tuning could be performed if the user is not entirely happy with the results.

Access to data, in accordance with all or some of the user policies, depending on a given implementation, could be governed in real-time at least with regards to some data requests. If a company requires data, or certain data, a push notification can be sent to a user device and, if desired, authentication controls along with active response consent can be used to acquiesce to or deny the request. So, for example, a request for atypical data, or certain flagged data or data of a given privacy level, may result in a push notification to a predefined device for user permission (and authentication, e.g., biometrics or PIN) if desired. This active-consent policy could also be applied to data flagged by the platform as valuable or sensitive—i.e., even if the user does not know that certain data is highly valuable or sensitive, the platform can determine the value or possible nefarious uses for certain data and notify the user via push notification, which can include more than a simple request for permission and may indicate any useful information about the value and/or sensitivity of the requested data. This can allow a user to better determine whether to share the data and whether any proffered value in exchange for the data is worth the sharing (based on the estimated value) and/or any risk associated with the sharing.

Policies can also define data retention for certain sites and applications. While it may be impossible to "force" a site to delete data, legal changes may require the sites and applications to comply with user instructions. Thus, the user can define what data may be stored and what data should be deleted 132, and the site or application may be legally obligated to comply. Once the user knows what information is being shared and what information is proposed for storage, the user will be able to decide which information should be removed after agreed-upon use. This can be defined as part of a policy tier and/or for individual websites or applications and/or tracked by the audit process 109.

Deletion policies 132 relate to both external storage 133 and internal storage 134 (in the PDS). Some data is so sensitive to users they may not want it stored anywhere (e.g., a social security number), and yet it may be periodically necessary to share this information. The audit process 109 can still keep a record of the fact that such data was shared (e.g., a placeholder such as "SSN shared with 000.111.000.111 at 10:11 PM on 1/1/21") without actually storing the data itself. This is useful for auditing and evidence that while the data was shared, it was also supposed to be deleted, and an entity that fails to do so will not be able to deny that the information was shared under a restrictive agreement. Partial deletion is also possible 135, which can be, for example, deleting the first five numbers of an SSN or deleting an address associated with a location, so that only certain aspects of sensitive data even exist in any form of long-term storage. This may be useful when the data is both sensitive and easily recreatable by the consumer 100 (e.g., a full SSN or a full address).

Third-party sites and applications 136 may access, use, retain and share data from the PDS in accordance with permissions provided to them directly or in general by a user. Some such entities may share 137 data with the PDS, and that data can represent data gathered about a consumer 100 or even inferences drawn about a consumer 100, if the third-party wants to build a strong relationship with the consumer. For example, a third-party may want to "prove" that inferences are useful to a consumer, in order to obtain a less restrictive policy, and therefore may share the inferences based on a sample set of data about that consumer. If the consumer likes the inferences and finds them beneficial, the consumer may agree to a less restrictive policy. The consumer benefits doubly from such sharing because the inference can be used as training for ML processes on the platform that provide additional insight about the consumer based on aggregated stored data. It may be required for the third-party to agree to such training, or the platform may require that aspect of the relationship in order for the third-party to use it in the first place. Policies may evolve and be modified over time and real-time permissioning and access can be governed by data access agreements that, among other things, define obtainment/procurement of personal digital contents from a privacy vault, define permissible usages of such personal digital content, and define retention of any obtained content, in terms of, for example, scope and duration, among other things. Parameters may be known by the third party requesting the contents access and/or may be conveyed in conjunction with any conveyed personal digital contents.

Third-parties 136 may also be able to pull permissible data 138, using an API, for example. The data (as discussed later) may be standardized and therefore accessible through standardized requests that identify elements, types, etc. of data to be pulled for one or more consumers 100. The requested data may be received 139 and used in accordance with a permission granted that third-party, and then deleted 140 or not deleted in accordance with the policy.

Once data in in the hands of the consumer the data may also be monetized 167 by the consumer as the consumer desires. A gateway, discussed more below, may provide offers to the consumer in accordance with a given consumer's desire to monetize their data. One consumer may elect to share the minimum necessary amount of data for any service and save it for the minimum amount of necessary time, and another consumer may be willing to share virtually anything and have it stored for virtually any amount of time, for the proper price.

Consumers may be able to sell their data even to sites or applications with which they do not interact. For example, a new business may need information about the food shopping habits of 20,000 people aged 24-29 within 10 miles of a city center. This crafted data request can be matched to the personal data stores of any number of correct demographics, e.g., based on someone's age, location and whether there is sufficient shareable shopping data in their PDS. Anyone meeting the criteria could be provided an offer for their data, and the first 20,000 respondents would receive the offer exchange. That allows for sale of highly targeted data, by the users, shifting that value away from the merchants who sold the users the food, for example, and to the users themselves.

In another example, the purchaser may only want the data if at least 15,000 samples can be obtained, so users could opt into a group for sharing, and if the group pool filled with sufficient data, the value exchange would occur. Otherwise, the data would remain secure with the user. Some purchasers may require storage of the data, others may allow individual users to define deletion policies, so even users with different deletion protocols may be able to participate in the same offers.

Because the platform may have access to the data of a large segment of a population (e.g., within a locality), or a "population" of certain demographics, businesses could receive access to the data of that population, subject to constraints imposed by participating consumers. The platform could additionally or alternatively provide insights, again constrained by the individual users. In either case, the individuals whose data was used could be anonymized and receive direct value for use of the data. This provides alternative monetization options when the data of an individual is less or differently useful than the data of a group or population. By allowing the PDS owners to band together to offer data about their group (e.g., via opt-in and exchange for various values), additional sources of data monetization can occur, and a user has assurances that their data is only used in a prescribed manner and is suitably anonymized. At the same time, the ability to provide these group insights can drive more businesses to use the PDS platform as a preferred source for data and help extract fair value for the data/insights.

A given third-party 136 may define an offer for data that is received by the incentive process 168. The process may audit the offer for appropriateness and may even provide a smart-estimate of value for the offer—e.g., most third-parties offer X value, but this third-party is only offering ½ X value. Offers considered to be "too unfair" could even be automatically rejected, if desired. Alternatively, consumers could be given a relative-value score for the offer, showing how comparable the offer is to similar requests for similar data. This helps keep the consumer informed about whether an offer is reasonable or needs to be rethought by the third-party. The same information could be conveyed back to the third-party as well, to encourage them to revise their offer.

Consumers could also see a score relative to other offers they have personally accepted. This can help standardize offers that may come in different forms (in terms of value offered) and allow the consumer 100 to know if the offer is of the sort they historically accept. Consumer history could even inform this process, since the PDS may know how frequent ordering or service interaction occurs. That is, a 3% discount from a service used daily may be significant over time, and even better than a 10% discount on a service used once a year.

Offers can include monetary offers 172 or be converted to approximate monetary value if they take the form of discounts 171, rewards (including rewards points), or cryptocurrency. If discounts and/or cryptocurrency are saleable, as discussed herein, the present value of such a discount on an open market could be used as the basis. The process could also calculate an expected value to a user based on usage, and a present value if the user sold the discount. As discussed later, sale of a discount may also require the purchaser to opt-in to the same data sharing provision that generated the discount, at least for the purposes of use of the discount. This is not a bad deal for anyone involved though, as it allows for additional data gathering (the third-party gets certain data for providing the discount, and other data about another person when it is used) and allows both consumers to derive value from the discount. third-parties may also be able to dictate whether a discount is saleable and under what terms.

Incentives are received 169 in exchange for the data (a direct payment or a right that is singly or continually usable, e.g., a discount, for example). The incentives can be spent 170 in accordance with usage of a given site or application, and the PDS can track all applicable and usable incentives and allow for application of an incentive and/or replacement of currency with stored currency when appropriate—e.g., if a product costs $10, the PDS can replace $2.50 of the cost with "PDS currency" that is effectively money stored on behalf of the consumer 100 from prior offer acceptances.

Consumers who elect to exchange their data for value may not want to be limited to the offers that correspond to the services they elect to use. For example, a user who shares information with a food-delivery service may receive a discount on the service for a certain level of information. The user may eschew discounts below 10% and always accept discounts above 15% for any data offer, and modeling (using the user's own data), may provide opportunities to present additional offers above 15% for services that may also be of interest, in exchange for data. The user could turn this off at any time, so as not to be overwhelmed.

On the other hand, the user may not want any of those services that the user is not already using, and so the gateway may conclude that value of approximately $7 is obtained for each data share of a certain level. Instead of providing discounts, or in addition to providing discounts, the gateway may provide offers that offer $7 in actual value (e.g., cash) in exchange for the data. Tokens, crypto currency, or other value may also be exchanged, a redeemable point system may even be used, for example, wherein offerors by cryptocurrency or points from a common pool, and reward consumers with those coins or points in exchange for data. Consumers can then use the gateway to spend the coins or points in exchange for goods, services, discounts or even change them for cash.

Users may also be shown data snapshots about what is being gathered and by whom through analytics insights 144. Data can be displayed in any reasonable format and per-site, per-category, per-day, etc. For example, one perspective may show a treemap or other construct that shows how many times each element of data was gathered by any site, or any site of a certain type, etc. Each box in the graph may show the relative amount of asks for the data relative to the other types of data.

Another graph may show each website and application, relative to each other, based on volume of requests. This could allow a user to see which applications and sites gather the most data about the user. The data could also be shown as requests per time unit, for example, to normalize the data, in case a user spending far more time on a given website was causing apparently excessive data requests.

Correlations of data, forms of displaying information, statistics about the data, analytics, etc. are all examples of what a user can be shown about their own data. Any reasonable format for presentation could be used, and the data about gathering and usage may be exportable for the user to interpolate using their own analytics process.

Analytics, accessible through a direct link to a PDS or a consumer gateway to their PDS, may show a consumer what might be concluded from their data. By approximating merchant inference models 145, or advertiser inference models, the gateway can demonstrate the conclusions that are likely being drawn, and even provide indications of what data is driving the conclusion. Such analytics (when run by third-parties) may not always be a great result for the consumer, for example, if a person is shopping for a gift for a spouse or a trip for the family, a later-user may receive advertisements for the same gift or trip, revealing a surprise. By allowing the user to see what ads and conclusions may occur, the user may elect not to share data that might result in such conclusions and, in the examples above, advertisements that would ruin a surprise.

Analytics may also provide a user with spending and browsing trends, so the user can better self-categorize their own behavior, as well as understand what computer-driven models might think of them based on their data. This may also help certain consumers conclude they are spending too much time or resources on certain sites or things and will allow consumers to benefit from their own data conclusions. Analytics can come from the platform owner and/or third-party sources who are given permission to access the data. Analytics may also be derived from a combination of the preceding or, for example, the logic for the analytics may come from a first source (e.g., the platform) and an analysis and presentation of the results, along with any accompanying recommendations, may come from a second source (e.g., a third-party application).

Some entities 146 may share direct insight engines with the platform, allowing for accurate modeling in accordance with the given entity. That is, if an entity purports to provide value-added analytics based on consumer data, the entity may actually want to share the conclusion processes so the consumer can confirm that the insights have value, and that alone may incentivize the consumer to share data with that entity. Other library elements may be approximations of what an entity is concluding and may be defined for a specific entity as an approximation or defined for a class of entities as what those entities typically attempt to glean.

More comprehensive backend models and newly generated backend models may also exist 147. Natural language processing models 148, 149 may be trained using labeled or unlabeled data and should improve over time. Other ML models 150 may also be trained using consumer data, with permission. These models can be attempts to either match or improve insight models observed by others and/or may be initially trained based on data gathered by others. For example, if food delivery services start asking for a user's streaming video viewing data, but will not share a model, attempts can be made to determine correlations between the newly requested data and the type of service—e.g., does viewing an add or certain content result in certain food orders. These models are not necessarily designed for the purpose of delivering ads to a consumer, but rather to inform the consumer about what is projected to be determined by sharing certain types of data. Once the model is refined, it can presumably show the consumer more or less exactly what is being determined and what the likely result is. Some people may not mind the result, as they may actually want French food after viewing content about France, but other people may consider this to be manipulative and prefer not to share the data.

A suite of further microservices 151 may also be provided to the consumer 100. This can include some basic metrics about data 152, such as statistics about site usage, data sharing, and relative statistics—e.g., how much the consumer shares relative to anyone or relative to a demographic to which the consumer belongs or does not belong. The consumer could presumably select the baseline set for comparison as well, from a list of available baselines. A consumer who considers themselves to be a luddite with regards to data sharing may want to know how much data they are sharing relative to a savvier demographic, for example. A consumer who considers themselves to be wise may want to know how much and/or what types of data they are sharing relative to a potentially wiser, comparable, or potentially less-wise or less-careful demographic. Parents may want to know if their child is sharing a reasonable amount of data relative to their child's peers.

Data can be viewed by category 153 as well, showing how much or what data is shared relative to a category. Categories can include, for example, types of data, types of services, sensitivity of data (e.g., data pre-classified as sensitive or less-sensitive), etc.

A timeline view 154 can show data sharing as instances (specifics), categories or general volume over time. This can help a consumer model behavior to demonstrate improvement over data sharing as time passes. Alternative concepts of a timeline can show high-points of sharing or spend/service-interaction, e.g., spend and service interaction around birthdays and holidays.

A data-shared view 155 can be another version of metrics 152 or specifics about what data is shared. This could also be a chart (as could any herein) that could be stepped-through, so that the primary chart could be a pie-chart, for example, and then instances could be stepped-through to see a sub-chart or the underlying information.

How is it used view 156 could show the consumer 100 how data is known or guessed to be used by various entities. This could be shown for a given entity, a class of entities or as a treemap, for example, showing relative uses of data (e.g., advertising generation vs. account interaction vs. order handling vs. etc.). Again, stepping through the data could show underlying services to which a category relates (types of ads, types of purchases, etc.). Consumers may seek to minimize certain portions of the chart.

Here, and elsewhere, the platform may offer tips and services designed to change outcomes. A consumer may be on a diet and may not want "fatty" food advertisements to pop up. The platform can help understand which data-sharing agreements and services are likely to result in these advertisements and help the consumer change policies and agreements to prevent such advertising. A parent may not want a child viewing toy advertisements, and the platform can help mask data that would result in such advertisements or interactions with vendors or third-parties likely to provide such information.

A psychometric profile 157 may help a person understand their own behaviors and/or likelihoods that, whether true or not, may be the perceptions that others have when viewing their data. Psychometric profiles can be generated on a per-type or per-$3^{rd}$-party basis as well and may generally tell a consumer what the third-party or class of third-parties likely thinks about the consumer based on the data. Interests 158 and other insights 159 may further help a person self-evaluate or even simply reveal how others may view them, when looking at data snapshots. Data itself can also be used to provide real-time services, such as behavior-based pricing services (e.g., telematics-based insurance quotes without requiring a dongle) and carbon footprint analysis. In the latter instance, for example, it may be possible to obtain a very comprehensive carbon footprint map based on, for example, user shopping, travel, delivery (boxes, weights), transportation-choice, power usage, etc. habits, all of which could be collected and stored securely in a privacy vault. As the data grows more comprehensive, spot-information (e.g., carbon usage of a powered-product per hour of use) could be provided to a consumer. For a very carbon-aware consumer, a separate application could execute as a web plug-in and, for example, provide estimated carbon usage associated with any product on a site such as, for example, AMAZON. That data can draw from existing habits and aggregate carbon usage and indicate, for example, whether the product matches those generally preferred by the consumer based on historical data, as well as what impact on an annual carbon footprint the product may have. This could all be presented real-time in conjunction with anything being contemplated for purchase.

FIG. 2. shows an illustrative privacy management platform. A layer of business partners may reside outside the platform and may represent third-parties that have various access permissions dictated by the gateway and/or by individual consumers 100. These can include the gateway provider 229 as well as social media sites 231, applications 233, marketplaces 235 and other sites.

The platform providing Privacy as a Business 200 can function as a gateway between the business partners and the consumer 100. An API 203 allows for defined interaction with consistent results, consistent function calls and consistent expected returned values (e.g., back to a requestor).

The platform 200 may also provide an interface 205 for the consumer 100, through which the consumer 100 may view the data 201 that was gathered from either existing offboard data storage or ongoing relationships that occur while the platform is managing the relationships. Accordingly, to protect the user and the data, the platform 200 may also provide robust security 207 against both nefarious login and external third-party intrusion.

The platform 200 may include cloud-based or backend PDSs 215 and data exchange processes 217 as described herein, allowing for users to exchange data between third-parties under various paradigms Analytics 211 and insights 213 help users understand their own behavior, trends, what is being shared and how it is being used. Account management 209 may include user permissions, data management, policy management, and credentials for the platform or other data sources.

Separate backend data storage or portable data storage (e.g., solely in the control of the user or in the control of the user with highly-secure redundancy on the cloud) may include a wallet 223, a portable PDS 225 and a portable value store 227. A single consumer may choose to have multiple different personal data stores for different purposes. For example, this could include a highly secure Personal Vault (with zero-knowledge architecture, advanced cryptography, etc.) for passwords, SSN, credit card numbers; a highly scalable and available Personal Cloud for real time read/write of operational data with all participating services (e.g. checking your service order history, checking your service delivery status, etc.); a Personal Archive for lower cost storage of data that is not required for real time operational use; a Personal Ledger for writing only the most important transactions to the block chain; and etc. Each of these PDSs may address a different combination of convenience, security, privacy, scalability, availability, cost, etc. that could match different use cases, and these are illustrative examples as it is appreciated that other variants on this multiple-PDS theme could also exist. The "wallet" may store payment methods and collect value (e.g., money or offers from businesses, exchanged for data, for example). The wallet may include digital ledger technology and provide transactional service in existing currency and virtual currency, for example, and may represent one form of PDS and/or an interaction services that interacts with one or more PDSs.

The portable PDS may allow the user to port and control some or all of their own data in a manner disconnect from the cloud. It could be synced across devices with user permission, periodically synced, and different devices may have different synchronization and storage permissions, so that, for example, a portable device may never store sensitive data even if it stores a copy of other PDS data. A highly secure redundancy may exist in the cloud in the case of catastrophic loss of a user's synced systems (e.g., a fire that consumes all devices). The redundant system may be outside the reach of the platform 200 and only usable as a backup to restore information to a newly approved device in possession of the user, for example.

A portable value store 227 may allow the user to port obtained value (money or discounts) and use the value on-the-go or even at a live site (e.g., a merchant brick and mortar). This may add additional value to the exchanged value, as it permits more expansive usage and does not lock the value to an online exchange. If there was a predicate for use, such as sharing data, using the value as a live currency or discount may result in a data-sharing instruction or require an on-site exchange of certain data stored in a portable PDS, for example.

PDSs may act as a data repository and reclamation point. As the gateway acts to assemble a profile of all the information stored about a given user, the user may want to recover their personal data from some sites. Certain sites may be willing to give the data back, other sites may simply agree to delete the data. Whether a consumer is entitled to see what data is stored by a given site will likely be a matter of contract and/or law. Sites may not want to show the full extent of data stored because it could reveal proprietary information about their algorithms, or it may just be embarrassing how much information they are storing. A contract with a consumer (e.g., a one-click license) may dictate whether the site has an obligation to share this information. Legal changes may override this, but presently some sites may be able to avoid sharing the scope and nature of information gathered and may simply instead agree to delete it.

In either event, as the gateway does get information from certain sites, it can build a mirrored data store in the PDS. As the data is reclaimed or mirrored, purging of some or all of the data may be requested. The PDS may also track browser history as a user browses and may contact each visited site on behalf of the user to determine what is/was stored and to dictate removal in accordance with user preferences.

Certain terms of service (ToS) may require a user to allow data sharing with an entity. But, when the user no longer uses the service, the user may often forget to cancel the account, and even when the account is cancelled, the provider may maintain the user data. If the provider was obligated to delete the data, but the user still wanted the service, the provider may be able to agree with the user to keep the data in exchange for continued service. Once the user no longer wants the service, under the forced-deletion model, the user may be able to request deletion and the provider may be legally obligated to comply. Deletions can be scheduled or suggested based on frequency of contact with a service.

Deletions can also be scheduled to occur regularly with regards to certain data. If the PDS and/or gateway knows what data was shared with which sites, it will know what data those sites may hold. Thus, it is simple enough to schedule deletion of this data, knowing the site has it. The site may also have ToS requiring non-deletion to maintain a relationship, and so the gateway may have a list of the common ToS and may be able to inform consumers if deletion may result in loss of certain services. Websites may also inform the gateway about impact of deletion in response to receiving a deletion request, and the gateway may pass these messages along to the consumer as well. The gateway can also help manage "data exhaust" for the consumer. If the platform observes that the consumer is throwing off excessive or analytically-excessive amounts of data, or if the consumer simply requests a reduction, the platform can use analytics to study existing relationships and recommend policy changes.

For example, a change for a website to a more restrictive policy may result in no loss of services to the website. The gateway/platform may observe that other users use similar services from the site with a more restrictive policy, and the consumer is thus simply giving away information in exchange for no additional value. The platform could automatically switch the policy or recommend the policy switch. In another example, the current level of sharing could entitle the consumer to a level of services the consumer never uses, or a discount could have been obtained and never once applied. The platform could inform the consumer of these instances and the consumer could decide if the more restrictive policy made more sense, given the lack of use of the benefit related to the less restrictive policy. Policy changing could occur in accordance with user settings as well, such as an automatic reversion if the benefit is not used within a certain timespan.

The PDS may also include data creation and storage aspects. As previously noted, certain consumers, who want to share their data and/or sell their data, may desire extensive data repositories in their PDS to maximize monetization offers. Other users may want to limit the data to that which is expressly required by the sites they frequent and applications they use. Users can instruct gathering and storage of certain data types and/or certain data, and could even request, for example—data/types commonly required by services offering more than $10 in value in exchange for the data. A request such as this could allow the user to pseudo-specify parameters for a high-value PDS.

As the system reclaims user data, it can also determine what sorts of data are gathered by what sorts of sites and applications. That is, the data recovery itself is an opportunity to train a given PDS as to what to gather and retain, and/or to train a gateway system that can pass the knowledge about what to gather and retain along to millions of PDS' s. This is not sharing of personal data—it is simply engineering data gathering plans based on observed gathered data. This may require momentary viewing of the data to classify it, but the gateway itself could offer some value for this opportunity to improve its own data gathering algorithms. Alternatively, participants may agree to such data usage as it does not relate to storage of personal information and it will collectively improve every participant's ability to collect replicas of the data that sites and applications were previously collecting.

Data collected in such a manner may be gathered based on group collection observations, individual collection observations related to that user, and based on modeling for demographic groups into which a user fits, especially if the user wants to expand the store of potentially useful information in the PDS. For example, a user's PDS (or a gateway or other application acting on behalf of the PDS) may gather information based on the fact that the user interacts with sites A, B and C, which gather first information. Crowd-sourced modeling may also reveal five other types of data commonly gathered by other sites, but perhaps not gathered by A, B or C, and so the PDS may also store this second information on behalf of the user. The gateway or PDS management system may also observe that the user fits into six demographic groups for which sites and applications may provide substantial yields of value-for-data, and the information typically requested for those groups (e.g., shopping habits, travel habits, etc.) may represent third data that is also gathered. This expansive data gathering may not occur for all users but may be relevant for certain users who are attempting to maximize the resaleable (or shareable/exchangeable) value for date from their PDS.

Additionally, a gateway acting on behalf of the PDS can homogenize the data, placing it in a common format easily processable by machine-learning algorithms. Data labeling, categorization, formatting, and other techniques can provide the data in a much more usable format than if the data were obtained from several disconnected point sources. Thus, purchasers may actually find more value in the same data when obtained from PDSs through the gateway, since the data may have been preprocessed into a standardized format, and presorted and labeled rendering it more immediately useful for analysis and categorization.

The gateway may also deduplicate the data, rendering a consolidation of data and allowing a purchaser to more closely determine how much unique data they will be receiving in exchange for value. That is, if the data was obtained from disparate sources, the data may represent significant overlay of the same facts. This may not even be discernable from the data, if the purchaser bought data about 100,000 people in a city from three separate data brokers, each site may have very similar data and it could be difficult to determine which data was duplicated or triplicated and thus may significantly throw off results. This is especially true if there is no way to ensure that the data is about the same 100,000 people from each broker.

That is, data from all three sets may indicate that 65,000 people eat fast food once a month, but those could be the same 65,000 people in all sets. At the same time, data from each set may indicate that 33,000 people eat at sit-down restaurants, but that data could be 33,000 different people in each set, so collectively it would represent information about 99,000 people. Or it could be the same 33,000 people. Without personal information, which may often be excluded even when data is obtained in present form, this disparity may be impossible to determine. Statistical modeling may be used to make some assumptions, which may render the observations generally valid over a large number of data sets, but for an individual entity it can be a very hit-or-miss enterprise.

On the other hand, if the data was from a single source and generally complete and deduplicated, the purchaser could "know" that the data points represented single non-overlapping data observations and so analysis could proceed with much greater confidence.

To access the data, requests can be in the form of a standardized request, which could resemble an API. Forms and other search formats could also be used—for example, a purchaser could browse categories of data and/or demographics and see how many data points correlated to a given formatted query. Dynamic queries may also be used, allowing a purchaser to craft a query string and determine how many data points are available for the given string, which may allow them to decide how much data they want to "purchase" and what price they will pay individuals or in the aggregate. Again, the price paid is not always in monetary terms, it can be in the form of discounts, cryptocurrency, points, etc. A purchaser may offer the greatest value in terms of discount, but still offer a cash or coin alternative if users did not want the discount. This allows purchasers to maximize data purchasing opportunities and allows users to choose the desired format for remuneration.

Common formatting allows for standardized requests and standardized responses, allowing for fast querying of data once the formatting is known, without a purchaser having to navigate and negotiate with varied platforms. This can also allow for software to easily interact with PDSs and the gateway, opening the opportunity for applications to be built on top of a user's own PDS. Similar to the gateway, the user may give access to their own PDS for an application that provides insights for the user's own benefit. With common formatting and a common source for data, these applications do not need to adapt to hundreds or thousands of possible data stores and source formatting and can much more easily provide valuable insights on a consumer's own data for a consumer using such an application.

If there is a gateway application residing on top of the PDSs, it may have additional business-facing aspects. Much of the prior discussion has focused on consumer-facing aspects, but it is businesses that rely on the data and the businesses that will provide any desired value-exchange for the data. This may include a number of standard terms of service agreements for businesses that reflect the various data gathering and retention policies of the gateway users. That is, prior to legal requirements that data be under the complete control of the consumer, a common gateway providing access to millions of data points in a consolidated and homogenized manner may be a valuable enough resource that the gateway can at least somewhat dictate some mandatory ToS in exchange for access. While it may be difficult to legally police compliance, the gateway may require regular audits of random accounts and other techniques to ensure compliance. The ToS may further impose significant monetary penalty for non-compliance, and/or removal of access to the resources of the gateway, and so draconian, enforceable penalties may encourage compliance even in the absence of express legislation.

To entice businesses into using the data available through the gateway from willing users, the gateway may provide a browsable interface allowing users to see the consolidated volumes of data available, even if the contents are generally restricted. Since the gateway may also be able, with permission, to model various demographic groups represented by the collective PDSs, the gateway may also be able to use this information to entice purchasers or entice increased value by demonstrating the various demographic groups that can be achieved at scale through combinations of different PDSs whose users are willing to exchange data for value.

Also, to the extent permitted and possible, the gateway may have significant observation about what data certain types of services consider to be important, and so a new service in a class could actually "ask" the gateway what information it should be considering. For example, the gateway may observe that fast food restaurants often want X, Y and Z information about consumers. A new fast-food restaurant may not appreciate this but could be informed by the gateway as to which information it should be seeking. Depending on how the gateway derived this conclusion, it may or may not be permitted to share these observations, but when permissible, this can be a powerful enticement for a new business to engage in value exchange with gateway users, as the determinations about which data to gather could also be provided.

In still a further example, users may be able to offer up their data for a certain price. This could even be tiered by rarity of a demographic. For example, a commonly occurring demographic may command a lower price for the data for that demographic, but a user representing a rare demographic that might be of particular use to a business could command more for the data because there simply may not be that much information available on that group. So, while the fact that someone is age 24-29 may command a low price for general information about people from that group, the fact that the person skateboards and travels frequently may be useful information for a company looking to build destination skateparks. That may be a much more limited size group of people and, as the essential target audience for the business, that information may be almost necessary to build that business and so may command a higher value.

Because of the large possible sets of demographics, as user may not always even know their own demographics, but they could set pricing based on rarity of possible demographics into which they fit. A purchaser crafting a custom demographic could bid based on the rarity of the data (e.g., there may only be 5,000 total distinct users in a highly targeted group, as opposed to 5,000,000 in a broad group) and the individual profiles would allow the users to opt in or out automatically. The user could set a preferred price (e.g., a preferential opt-in point) and/or a lowest acceptable minimum A bidder could offer first value and be told how many users are "in." The user may also be told how many users would be in if they raised the price to certain preferred prices. Users would be incentivized to keep their pricing close to the group to avoid being left out for being too expensive.

The gateway could pool users to create a collective offer and distribute value pro-rata based on participant indicated pricing. In this model, the purchaser could define a size of results wanted and simply be told how much it would cost to purchase the data of that size. The prices per user may vary, but the aggregate is how much for which all users are willing to collectively sell their data. Preferred pricing can be defined in the form of currency, crypto currency, points, discounts, etc.

Businesses may submit offers to the gateway in exchange for data. These offers could be presented as part of a normal business transaction or as one-off or continual opportunities, even for people who do not use the business. For example, a first service may only be interested on data about people who already use their service, and so may offer only discounts and only to customers. The gateway could include an application or plug-in that launched when certain sites were visited or applications were used, which would launch a version of the site or application that included data sharing in exchange for value options. E.g., a customer could login under option A, which shared no data other than that absolutely necessary to complete a transaction, provided no discount, and resulted in no long-term storage. Option B may provide a one-time discount in exchange for a certain level of data, to be retained for no longer than one week. Option C may provide an ongoing discount for the right to collect certain data weekly and store it for as long as option C's discount was still applicable.

A different site may simply want data from any source and may offer either discounts or cash depending on who is providing the data and/or which form of value they prefer. A regular user of services of the site may still prefer discounts, as they may be worth more than cash, but other non-users may still provide valuable data about habits and may prefer value other than discounts. With permission, discounts may also be theoretically saleable—wherein user A could sell their discount to user B (e.g., 10% off of an order up to $100), but, to provide value to the merchant, the user B would have to submit at least temporarily to the terms of the agreement with A. That is, for a limited time period at least, user B would have to provide the data user A would have provided. The required data could be identified as part of an offer for the exchange, to ensure B agreed to the terms. This would allow users to collect discounts and exchange them for value if they were not being used, while the merchant would still presumably benefit from the purchase as well as the additional data collected about a new user.

Businesses could also target certain recipients for offers. A business opening a new location in a new metropolitan area want to quickly gather habit and shopping information about people in what was considered to be a relevant shopping area, and so could limit the offer to a certain geography of users. Further, the discount could be higher in order to entice purchasing, but again may only be applicable to those local users. Or the business could offer the discount to "missing" demographics, such as a user group the business thought it should be servicing but apparently was not.

Not only does the business get to offer the discount to these missing users, but it can also gather information on users who agree to the exchange, which can allow it to improve offerings targeted towards those users. This can be a powerful incentive to encourage participation from business, which can more quickly revamp to entice a new demographic. Since the business will be now offering services more appealing to that demographic, the demographic benefits as well, by being provided with more preferable options from the business. Businesses could also exclude demographics or regions, if, for example, they were already fully servicing certain areas or clientele, they may not want that data, and it may be faster to define which data they do not want than which data they do want.

Consumers may have similar control and may exclude certain data from certain businesses as they see fit, either specifically or categorically. For example, if consumer data indicated the consumer was on a diet, they may want to share that information with fitness services but exclude that information from fast food services, who may seek to tempt the user back to unhealthy food even if, or because, the user data reflects the present intent to diet.

In at least one alternative, the platform could offer competing offers from alternative businesses, that may sell a similar good or offer a similar discount/value in exchange for less data. For example, if a user was ordering food from restaurant A and delivery service A, delivery service B may have a better offer for the same food from restaurant A. If the user frequently used service B as well, the offer may be of obvious value. On the other hand, relationships between the consumer 100 and service A as opposed to service B may reveal a clear preference for service A over service B and the offer could be avoided.

PDSs and similar data storage solutions may take the form of portable user wallets completely under control of a user. That is, in one example, they may reside exclusively on user devices. The problem with such a model is that a loss of access to the store would render the whole dataset lost, and so a user may still prefer that a secure, and possibly encrypted, backup of the data be kept in the cloud and updated periodically, or as new data is gathered. At the same time, if the user had direct control over the PDS, the user could dictate which gateways and applications had permission to directly interface with the PDS.

An application or website could act as a general point of access for a PDS, whether it was stored locally or in the cloud. Since the data would likely be encrypted in some manner, or at least somewhat confusing if viewed in raw form, the user would often prefer and interface allowing them to interact with their data in a more meaningful manner. This could include a local application that did nothing more than present the data more usefully and run basic queries, responsive only to the user, or it could include a comprehensive management system that maintained the data, created value-opportunities, created business-facing opportunities to entice value, etc. Any data stored in the PDS, whether under external or user control, could be encrypted at both the file and data level, which can include having data encrypted at the data level having one or more additional passwords or keys associated therewith. This may require multiple levels of decryption, but may render the data more secure.

Figure 3:
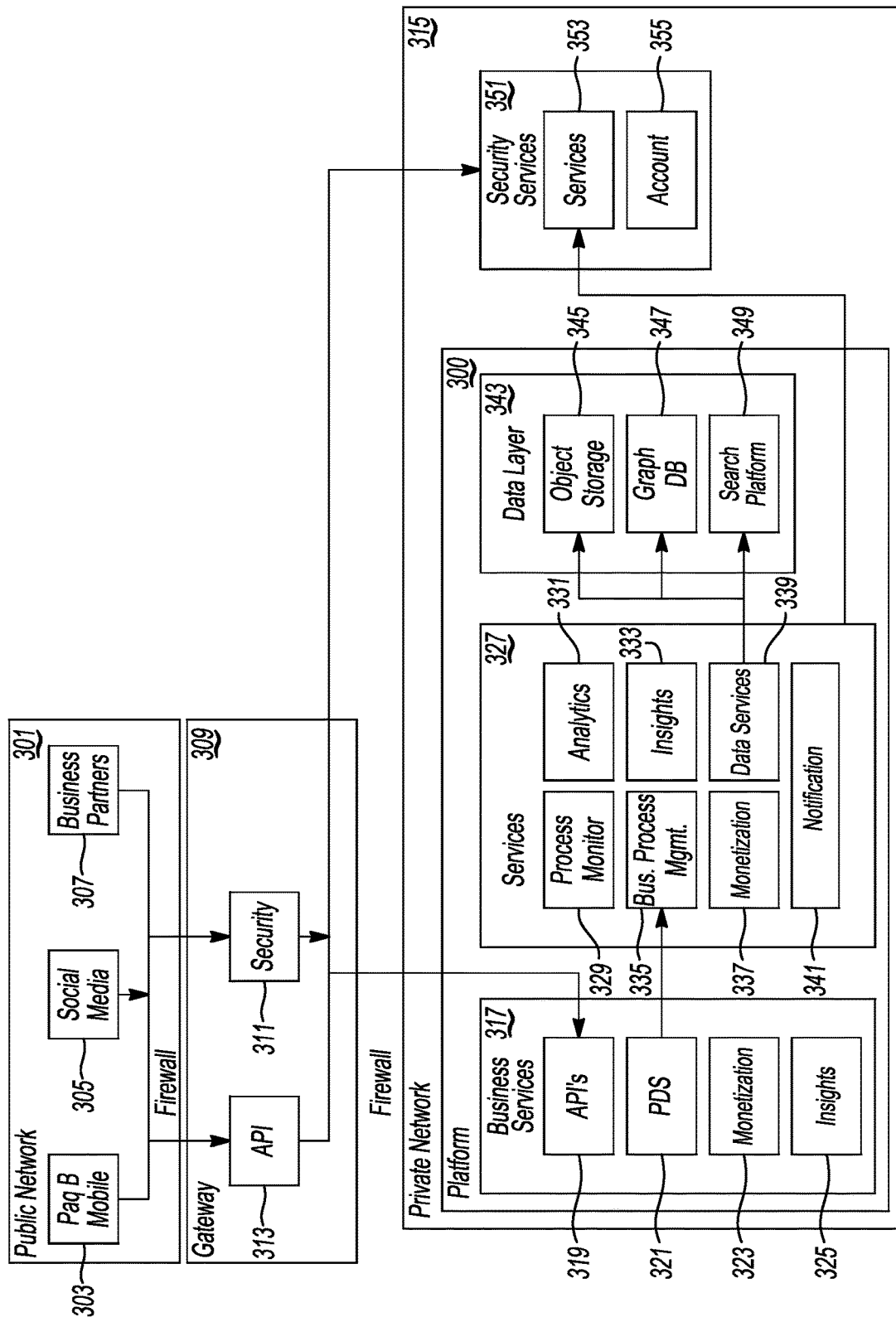
FIG. 3 shows an illustrative example of a logical layout of a data-privacy ecosystem.

FIG. 3 shows an illustrative logical view of a data ecosystem including the platform, a security gateway, and public networks. In this example, "public" networks 301 may include unsecured access points outside of direct control of the backend platform provider, which can include, for example, a mobile application 303 for accessing the platform or other mobile applications that reside on top of the PDS and are, for example, approved but not controlled by the platform provider, social media or other websites and applications 305 and/or business partners 307 that have defined accesses and or existing permissions.

Requests for information to or from the platform 315, which can include data requests, access requests, exchange requests, new offers, etc. can be instituted using a common API 313 and pass through a security gateway 309 that includes both security review 311 and API request review 313 for, for example, proper formatting and usage.

On the backend, business services 317 define the API accesses 319 that businesses can use and commands usable by third-party applications to model, view, share, use data, etc., in accordance with defined policy.

The services can also add content to a PDS 321, share content from the PDS 321 in accordance with policy, and delete content from the PDS 321 in accordance with policy or direct instruction. Each policy-based action could theoretically also be called via a direct request, so that new content can be expressly added and/or certain content can be expressly shared, outside of automatic action by a policy.

Monetization opportunities 323 can be both business and consumer facing, wherein businesses can use the interface to craft opportunities and incentives, or craft spending opportunities for gathered incentives (e.g., cross-service discount usage or use of cryptocurrency or stored value). Consumers can view offers and incentives already gathered and adjust their offer-viewing settings, for example, if desired, in order to obtain more or fewer sharing offers.

Insights and data services 325 can provide vast personal self-knowledge and an understanding of how other entities view the consumer. This can provide various consumer-facing information such as profile views, evaluations, timelines, and other analytics.

All of the various business layer services can be supported by microservices callable by one or more externally facing services and illustrated in the non-limiting services layer 327. This can include process monitoring 329, analytical models 331, insights 333, business process management 335, monetization services 337 and personal data services 339. The business services may provide the connecting services from the requesting service to the platform. The micro services may provide the service which process the data for a specific business service or other micro service. Event notifications may include triggering events that launch a micro service such as data arrival event in the personal data store.

A data layer 343 can store data objects. The data layer 343 may include different representation of the data. For example, one representation might be a graph data base, another might be a database, another might be file based.

Security services 351 residing on the platform provide ongoing security over internal requests and include identity management (IDM)/security access manager (SAM—e.g., such as provided by IBM (iSAM)) services as well as user-account credentials, policies, etc. 355.

The following illustrative processes show several non-limiting examples of how data and consumer interactions can be handled in a way that provides security to a user, transparency over data, policy-controlled interactions, user assurances of compliance and active negotiation for value. Many other illustrative processes are appreciated to be within the scope of the illustrative embodiments and the like, and the following are presented to provide a general sense of the scope of capabilities of at least certain aspects of the illustrative embodiments.

Figure 4:
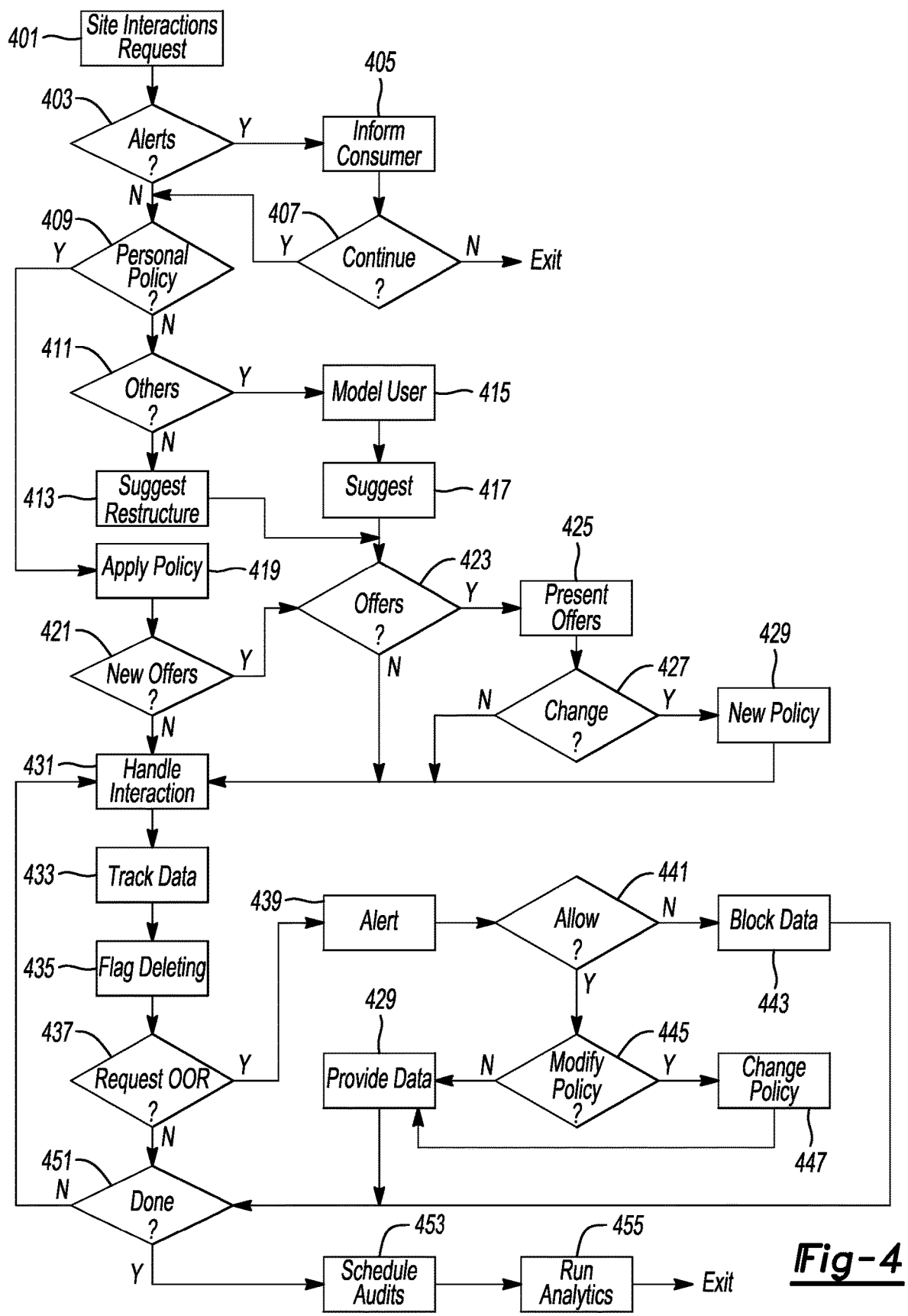
FIG. 4 shows an illustrative example of a data management process.

FIG. 4 shows an illustrative example of a data management process. IN this example, the platform may receive a request from a user for a site interaction at 401. This could be a website request, an application launch, etc. The active privacy management platform may run in the background of both devices and/or browsers and react to any instance where anything other than some basic data is requested from a user, or simply react every time any interaction occurs, since every computer interaction involves some exchange of data.

Responsive to the request or attempt to navigate to a site or launch an application, the privacy platform determines if there are any alerts associated with the third-party entity at

403. This could be violations of past policy, security breaches, blacklisted bad-actors, etc. Alerts can be passed to the consumer at 405 and if the consumer still elects to proceed at 407, the process can continue. Even if a previous relationship was established, new violations of policy or a data breach may cause the consumer to rethink a relationship or site/application usage and may be worth identifying for a consumer 100.

The platform may also determine if the consumer 100 has an existing relationship with the third-party entity at 409. This would be, for example, prior interaction either through the platform or prior to adoption of the platform, and a resulting policy may already apply. If the consumer has no prior relationship or defined policy at 409, the platform may consider whether other consumers have a relationship with the third-party at 411. If there is no accessible knowledge of any platform user having a relationship and policy, the platform may recommend a highly restrictive policy at 413.

Using the preferred relationships of others, the platform may model the user at 415 based on both other user preferences and demographics of similar users, for example. The user may have a tendency to adopt privacy policies of a certain demographic, or may have personal preferences that are not categorizable, and weighting can be applied to the analysis accordingly to recommend an initial policy at 417 that is likely consistent with a user's general preference.

The suggested, or another possible, policy may have value-added offers associated therewith, and the platform can check for this at 423. Even if the user already had a policy at 409, and that policy was applied initially at 419, there may be new offers at 421 to revert to a new, less aggressive policy and those may be considered by the user at 423 in case the user wants to change policies in exchange for a new offer.

In the case of a new user relationship, the recommended policy may include an offer and/or other less aggressive policies may include better offers and so the user may be provided with the better offer as well as any applicable offer relative to the recommended policy at 425. The offers do not have to be policy-by-policy, as noted, and may instead pertain to a carve-out for certain data or a change to a use or retention aspect for certain data.

The offer may also require a policy change at 427, depending on whether it is a one-off offer or a change to policy in exchange for value. Any new required policy modifications can be performed at 429 and stored for that user-third-party relationship. Some users may want to avoid this step and may have, for example, a default policy setting for new relationships and/or settings that simply require the platform to use any prior policy unless the user expressly requests change or the third-party expressly requires change.

Once the policy has been applied or changed and applied, the platform can handle the interaction at 431. This can include, for example, providing data in accordance with the applied policy and tracking the provided data at 433. Any deletion requirements applied by the policy and/or user general settings may dictate flagging of certain data sharing for later audit at 435, as discussed in greater detail with respect to FIG. 5 below.

Occasionally, the third-party may request data that is outside the scope of the policy (an out of bounds (OOB) request) at 437. This could be a request for data not covered by the policy, or data restricted out by the policy, for example. The platform can alert the user of such requests at 439 and the user can determine whether to allow the request at 441. If the request is blocked, the platform blocks the data at 443. As before, the user may have general settings to simply block such requests, which may be overridden by, for example, an express requirement by the third-party for the data in order to proceed (presenting the allow/block model) but which may otherwise simply block any non-necessary requests.

If the user allows the request, it may be one time or it may result in a change to the policy at 445. If a modification is requested, this can occur at 447 and change the policy for that relationship. This may be in exchange for new value, as discussed in greater detail with respect to FIG. 6 below.

Whether or not the policy is changed, if the user approves the request the platform allows the data to be passed (and may flag the data and sharing) and then continues to monitor the interaction until the interaction is fully complete at 451 (e.g., the user leaves the site entirely, logs off, exits an application, etc.). Any audits necessary or recommended based on the shared-data may then be scheduled at 453 and any useful analytics may be run at 455.

With regards to the audits, certain users may require or request (or even pay value for) regular audits of all data supposed to be deleted from third-party sites. In other instances, audits may draw from a random pool of data that was supposed to be deleted, and so scheduling an audit in this context is simply adding the shared to-be-deleted data to the resource pool. The data itself may not be stored, but rather referenced and the audit process may have express permission to look up the values if the audit randomly selects that data for deletion-auditing.

Users may also define analytics that are preferred after all or certain interactions. For example, a user may want a "spend" audit after every interaction that involved use of financial data for goods. This could be an immediate spend audit (the current interaction) and a longer-range spend audit related to all spend or spend within a category, for example. Any other suitable analytics can be run as well, and it is not necessary to run any analytics at completion if there are no present analytics desired.

Figure 5:
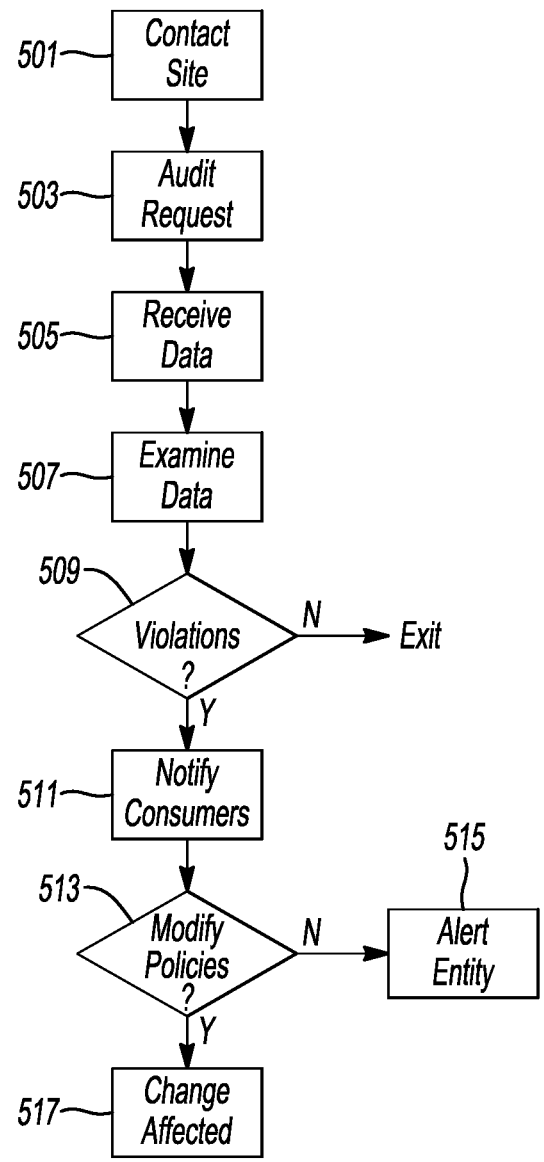
FIG. 5 shows an illustrative example of a data auditing process.

FIG. 5 shows an illustrative example of a data auditing process. In this example, an audit process may contact a third-party site or repository on behalf of a user or on behalf of the platform at 501. Audits can be run user-by-user, or audits can be periodic with regards to any entity for which data-deletion was instructed.

The platform may send an audit request at 503, with which the site or entity may have to mandatorily comply based on existing agreements. This can include, for example, a request for specific data about a user and/or randomized (but specific in the request) data from a group of users, representing data that was supposed to be deleted. The request may be, for example, a request for all data about users whose data was included in the random set, as opposed to specific data about those specific users, so that the full set of what was retained can be contemplated and the entity can be less strategic about response (not necessarily knowing what will be checked). Of course, entities can lie, but any future audit revealing such a lie and/or breach revealing that supposed-to-be-deleted data was compromised could be grounds for legal action and termination from participation in the platform, so compliance will hopefully be forthcoming.

Upon receiving the responsive requested data at 505, the audit process can compare the stored data to the data that was supposed to be deleted at 507, effectively looking for the absence of data, for example. That is, user account names and basic information may be permissibly stored, but certain ancillary information may be expected to be not included in the response.

The audit process may flag at 509 any violations, if any, and proceed with certain mitigation actions. These actions can include, for example, notifying the affected consumers at 511 as well as launching a full-scale audit to determine if comparable data was stored for all users when it was supposed to be deleted. Another possible mitigation action could be automatic modification of all affected user policies or all policies in general, essentially resetting the entity to an aggressive baseline.

Some users may not want the reversion, as they may be agnostic about the data and/or don't want the hassle of reverting the policy if they still want the services, and so personal user settings can dictate whether automatic reversion occurs. Any necessary changes can be enacted at 517 and both the entity and users can be alerted at 515. The entity may be given a grace period with which to comply, and/or users can elect reversion or non-reversion responsive to the alerts if that approach is preferable or dictated by user settings. The most draconian approach, short of litigation to enforce deletion, could include a temporary or permanent ban of services to the entity, or a ban with respect to all users except those who expressly indicate an interest in continued business and sharing.

Figure 6:
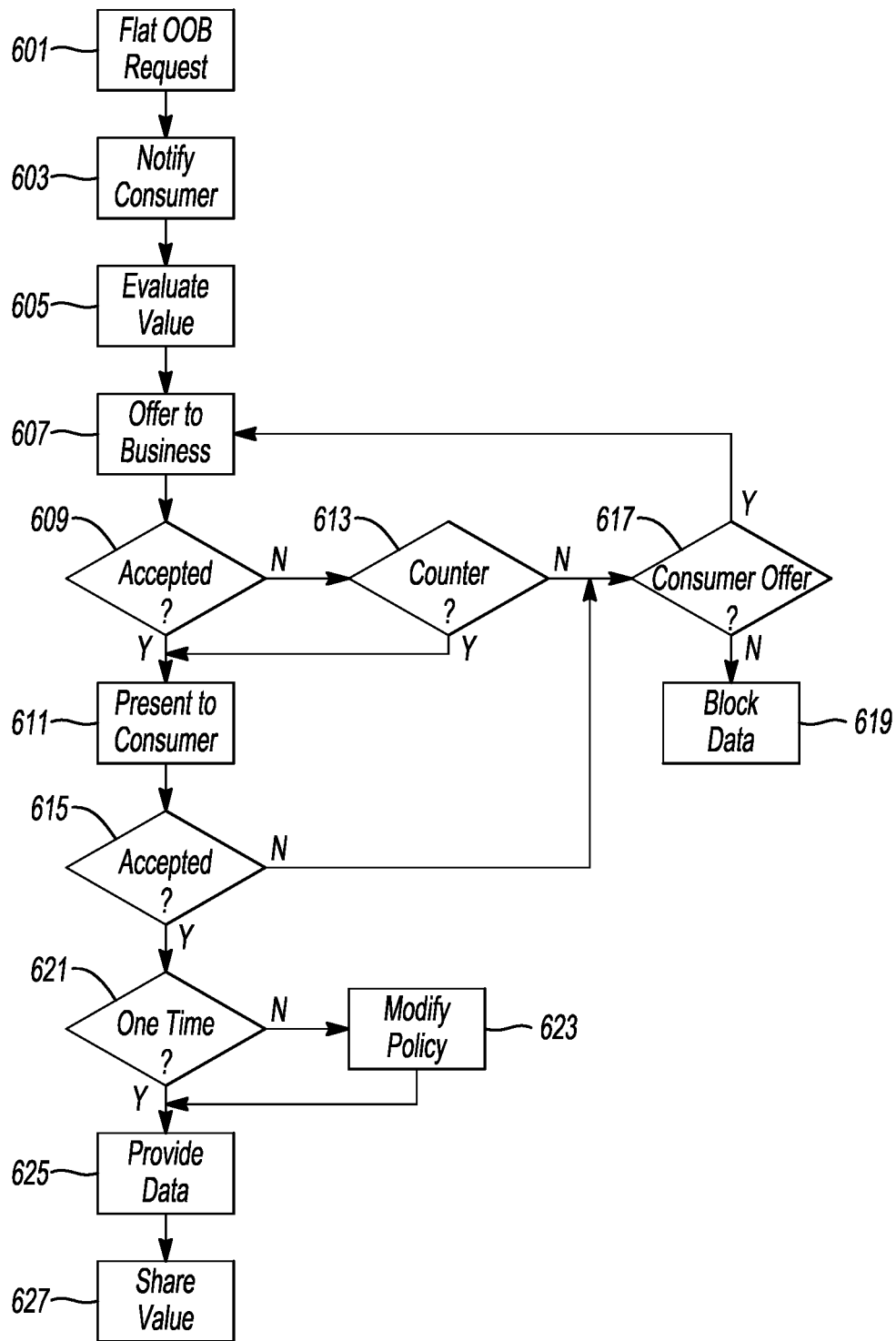
FIG. 6 shows an illustrative example of a data negotiation process.

FIG. 6 shows an illustrative example of a data negotiation process. This is an example of what may occur when a process requests OOB data, which can include data not expressly covered by a policy and/or data outside the bounds of a current policy.

In this example, the platform may receive a request for data that is OOB. For example, data not defined by the policy could be requested, such as data not expected by the entity and therefore uncovered by the policy. In other examples, the data could include more-secure data that is restricted or blocked by the policy. The request can also be a retention or use request and does not necessarily pertain to a type or element of data, but rather a usage or retention of already permitted or currently not covered or permitted data. This example provides a non-limiting embodiment demonstrating how a consumer can actively derive and negotiate value-for-data.

The platform may notify the consumer of the request at 603, including identifying any OOB aspects of the request, such as, but not limited to, types of data, retention, use, etc. The third-party may recognize the OOB nature of the request, knowing the relationship, and may further provide a reason for the request which may be passed along to the consumer.

In this example, the platform will leverage its own analytic capability and the premise of thousands of varied value-exchanges to evaluate the value of the request in terms of what others are already offering at 605. While not necessary, this allows the consumer to make an educated decision about relative value and determine if the entity is being "fair." Accordingly, the platform determines an approximate value or range of value for the request and presents it to the third-party. It is also possible the third-party has no concept of the market, and so they can evaluate whether the data is "worth it" relative to their own planned usage and the expected cost. The expected value could also be derived based on negotiations for the same data from prior consumers, for example, from the same entity, ensuring some consistency in value-exchange and further protecting the consumer.

The platform presents the offer to the business first at 607, which may involve negotiating with a machine. If there is no available machine negotiation on the other end, the request may be blocked until a person can decide to accept or reject.

In other examples, the API can define parameters for such negotiation, wherein a data-call or a general protocol can dictate the confines of offer-acceptance without an active ML/AI entity on the other end engaging in negotiation. For example, a business could dictate that it will engage in 2 rounds of negotiation for 15% less-than and then 100% of fair market value, subject to consumer acceptance and not-to-exceed $1. That could be coded into a request or entity profile to enable such negotiations in an automatic manner without human intervention.

If the business accepts the offer at 609, the offer is then presented to the consumer at 611. If the business counters at 613, the counteroffer is presented to the consumer. Using the simple preceding example, the offer to the business may initially be at 100% of fair value (as determined by the platform) and the business would counter at 85% of fair value. If the consumer rejected the offer, or if the business was out of counters or did not counter, the consumer could present a counteroffer at 617. If the consumer rejected the offer and did not counter, the process could block the data at 619.

If the consumer countered, the offer could be re-presented to the business at 607, which may also have rules defined for dealing with counteroffers. Using the preceding example, the business may have a further rule that as long as the counter is below $1, it will be accepted, provided that number is not also more than 50% above fair market value. If the number is above 50%, the business could again counter with the final top number (150% of value).

For example, assume the platform determines a data request for one-time use of non-stored data is worth $0.60. The business has automatic rules to first counter with $0.51, but also automatically accept anything up to $0.60 as a counter or as the final offer if the consumer agrees. If the consumer countered with $0.95, the business would re-counter with $0.9, the max value it would pay. If the consumer rejected, they may still be told that the data would be blocked unless they took the $0.90, allowing them a last-chance. This is merely an example of how a human can negotiate with a machine and while it is appreciated that a savvy human could manipulate the system to always get the max value, especially with a last-chance-best-offer provision, it is also appreciated that more complex game-theory could be applied to the machine side of the negotiation to avoid such outcomes.

If the parties can come to an agreement at 615, the process determines if this is a one-time data provision at 621, or if it results in a policy change at 623. The impact and long-term effect can be conveyed to the consumer, so they are negotiating with complete information. Once the negotiation is complete, the platform can provide the requested data at 625 and store any value derived by the consumer at 627.

The illustrative embodiments, aspects of the illustrative embodiments, and the like, provide for elements of a data privacy ecosystem that shifts the balance of power away from the third-parties that presently hold consumer data to at least level the field. Consumers are provided with presently-missing information about and control over their data, as well as new opportunities to monetize that data and extract a measure of its value. The embodiments may also expressly add value to the data through homogenization and standardization. Back-end analytics allow consumers to view new insights about themselves and the conclusions that are being drawn about them. Portability and security aspects ensure improved management, optics, understanding and control over personal data, and generally serve to wrest back data and value from the entities that presently act unfettered.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A system comprising:
   a privacy vault, storing:
      contents associated with a user to whom the privacy vault is assigned;
      a plurality of access permissions, defined for a plurality of third-parties with whom the user has an agreed-upon sharing relationship, at least one of the access permissions defining, for at least one of the plurality of third-parties, one or more procurement policies, defining at least contents obtainable by the least one third-party, and one or more utilization policies that define at least one restriction, on use of the contents obtained under the procurement policy for the at least one third party, that applies to the third party, for which it is defined, after the third party obtains the contents; and
      a plurality of user accounts and associated access credentials for the user;
   one or more processors, configured to:
      access one or more of the user accounts, using the access credentials, to recover contents associated with the user, previously gathered and stored by the accessed account;
      store the recovered contents in the privacy vault;
      receive a request from the at least one third-party, to access the contents stored in the privacy vault, the request identifying which contents are requested;
      determine if the contents requested are procurable by the at least one third-party based on the at least one access permission defined, in the privacy vault, for the at least one third-party; and
      responsive to the contents being procurable, provide the contents to the at least one third-party along with providing any constraints on the contents, the constraints defined by the one or more utilization policies of the at least one access permission defined for the at least one third-party and specifying the at least one restriction on use and sharing of the provided contents by the at least one third party after the third party obtains the contents, the restriction specified specifically for the at least one third party based on the at least one restriction being stored by the vault as specifically applying to the at least one third party.

2. The system of claim 1, wherein the plurality of access permissions define a plurality of incremental levels of privacy, wherein the at least one access permission for the at least one third party further defines one or more retention policies for the at least one third party, defining at least content retention for the at least one third party for the contents accessed by the at least one third-party, and wherein provision of the contents includes transmission of express indication of any retention constraints for the contents defined by the retention policies of the at least one access permission defined specifically for the at least one third party based the retention constraint being stored by the vault as specifically applying to the at least one third party.

3. The system of claim 1, wherein at least one of the one or more processors is configured to categorize the contents as the contents are recovered for storage in the privacy vault.

4. The system of claim 3, wherein the plurality of access permissions are correlated to categories of the contents and wherein at least one more permissive of the plurality of access permissions is correlated to at least one first category that is also correlated to at least one less permissive of the access permissions, in addition to being correlated to at least one second category not correlated to the at least one less permissive of the access permissions and wherein the correlations define access to the categories correlated to a respective access permission.

5. The system of claim 3, wherein the request identifies one or more content elements, and wherein at least one of the one or more processors is configured to determine one or more categories associated with the one or more content elements, and wherein the determination as to whether the contents are procurable includes determining whether the at least one access permission defined for the at least one third party permits procurement of contents from the determined one or more categories.

6. The system of claim 3, wherein the categories include types of contents.

7. The system of claim 3, wherein the categories include sensitivity of contents.

8. The system of claim 1, wherein the recovered contents include personal data about the user stored by the account.

9. The system of claim 1, wherein the recovered contents include data about behavior of the user tracked by a party providing the account.

10. The system of claim 1, wherein the privacy vault further stores a configuration for default access permission application to a new third-party and wherein at least one of the one or more processors is further configured to:
    receive identification of the new third-party;
    determine whether any modification, to a default access permission to be applied to the new third-party and indicated by the configuration, applies to the new third-party based on any agreement information determined responsive to identification of the new third-party, the modification at least changing an access right of the new third-party based on the agreement information; and
    responsive to determining that no modification applies, associate the default access permission with the new third-party based on the configuration.

11. The system of claim 10, wherein the modification to the default access permission is based on a pre-existing relationship agreement with the new third-party granting permissions to contents correlated to a less restrictive access permission than the default access permission and wherein at least one of the one or more processors is configured to associate the less restrictive permission with the new third-party, responsive to determining that the modification applies.

12. The system of claim 10, wherein the modification to the default access permission is based on a value-exchange agreement between the user and the new third-party granting permissions to contents correlated to a less restrictive access permission than the default access permission and wherein at least one of the one or more processors is configured to associate the less restrictive permission with the new third-party, responsive to determining that the modification applies.

13. The system of claim 10, wherein the modification to the default access permission is based on a value-exchange agreement between the user and the new third-party granting permissions to contents correlated to a less restrictive access permission than the default access permission, a scope of the contents correlated to the less restrictive access permission being defined in the value-exchange agreement, and wherein at least one of the one or more processors is configured to:

create a hybrid access permission granting access to contents correlated to the default access permission along with contents covered by the scope; and associate the hybrid access permission with the new third-party, responsive to determining that the modification applies.

14. A system comprising:

a privacy vault, storing:

contents associated with a user to whom the privacy vault is assigned;

a plurality of access permissions, defined for a plurality of third-parties with whom the user has an agreed-upon sharing relationship, at least one of the access permissions defining, for at least one of the plurality of third parties, one or more procurement policies, defining at least contents obtainable by the least one third-party, and one or more utilization policies that define at least one restriction, on use of the contents obtained under the procurement policy for the at least one third party, that applies to the third party, for which it is defined, after the third party obtains the contents; and a plurality of user accounts and associated access credentials;

one or more processors, configured to:

access one or more of the user accounts, using the access credentials, to recover contents associated with the user, previously gathered and stored by the accessed account;

categorize the recovered contents as the contents are recovered;

store the recovered contents in the privacy vault and associate applicable categories, as indicated by the categorization, with the stored recovered contents;

receive a request from the at least one third-party, to access the contents stored in the privacy vault, the request identifying which contents are requested;

determine if the requested contents are procurable by the at least one third-party based on the at least one access permission defined, in the privacy vault, for the at least one third-party; and responsive to the contents being procurable, provide the contents to the at least one third-party along with providing any constraints on the contents, the constraints defined by the one or more utilization policies of the at least one access permission defined for the at least one third-party and specifying the at least one restriction on use and sharing of the provided contents by the at least one third party after the third party obtains the contents, the restriction specified specifically for the at least one third party based on the utilization policy being stored by the vault as specifically applying to the at least one third party.

15. The system of claim 14, wherein the categories include at least one of: types of contents, sensitivity of contents, or services to which the contents relate.

16. The system of claim 14, wherein the request identifies one or more content elements and wherein at least one of the one or more processors is configured to determine one or more categories associated with the one or more content elements and wherein the determination as to whether the contents are procurable includes determining whether the at least one access permission defined for the at least one third-party defines procurement of contents from the determined one or more categories.

* * * * *